(12) United States Patent
Eguchi

(10) Patent No.: US 9,207,439 B2
(45) Date of Patent: Dec. 8, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Yosuke Eguchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/318,980

(22) Filed: Jun. 30, 2014

(65) Prior Publication Data

US 2015/0015968 A1    Jan. 15, 2015

(30) Foreign Application Priority Data

Jul. 10, 2013  (JP) ................................. 2013-144608

(51) Int. Cl.
*G02B 15/14* (2006.01)
*G02B 15/173* (2006.01)

(52) U.S. Cl.
CPC .............. *G02B 15/173* (2013.01); *G02B 15/14* (2013.01)

(58) Field of Classification Search
CPC ...... G02B 13/009; G02B 15/14; G02B 15/15; G02B 15/16; G02B 15/20; G02B 15/22; G02B 15/173
USPC ............. 359/676, 683, 694, 695; 348/240.99, 348/240.1, 240.2, 240.3, 335, 345; 396/72–88

See application file for complete search history.

(56) References Cited

U.S. PATENT DOCUMENTS 4,874,231 A * 10/1989 Aono ............................. 359/684
2011/0080651 A1 * 4/2011 Sakamoto ..................... 359/683

FOREIGN PATENT DOCUMENTS

| EP | 919844 A1 | 6/1999 |
| EP | 2306231 A1 | 4/2011 |
| JP | H06-242378 A | 9/1994 |
| JP | H10-31157 A | 2/1998 |
| JP | 2011-81065 A | 4/2011 |

OTHER PUBLICATIONS

European Search Report issued in corresponding application No. 14002252.6 on Nov. 28, 2014.

* cited by examiner

*Primary Examiner* — Scott J Sugarman
*Assistant Examiner* — Gary O'Neill
(74) *Attorney, Agent, or Firm* — Carter, DeLuca, Farrell & Schmidt, LLP

(57) ABSTRACT

A zoom lens, including, in order from object side, a positive first unit, a negative second unit, a positive third unit, a negative fourth unit, and a positive fifth unit. The first unit includes, in order from object side, a negative first sub unit which does not move for focusing, a positive second sub unit which moves during focusing, and a positive third sub unit which does not move for focusing and includes a negative lens. 1.6<L2tm/L2t<1000.0; L2w/L3w<1.0; and −0.5<f2/f3<−0.05 are satisfied, where L2t represents an second-third unit interval at a telephoto end, L2tm represents second-third unit interval at a zoom position at which an interval between the third and fourth units is minimum, L2w represents second-third unit interval at a wide-angle end, L3w represents third-fourth unit interval at the wide-angle end, and f2 and f3 represent focal lengths of the second and third units, respectively.

5 Claims, 11 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, which are particularly suitable for use in a broadcasting television camera, a cinema camera, a video camera, a digital still camera, and a silver-halide film camera.

2. Description of the Related Art

In recent years, a small and lightweight zoom lens having a wider angle of view, a higher zooming ratio, and higher optical performance is required for an image pickup apparatus such as a television camera, a cinema camera, a film camera, or a video camera. In particular, image pickup devices such as a CCD and a CMOS, which are used in the television or cinema camera as a professional video photographing system, have a substantially uniform resolution over the entire image pickup range. Therefore, the zoom lens using the image pickup device is required to have a substantially uniform resolution from a center to a periphery of the screen. Further, reduction in size and weight is also required for photographing modes that put a high priority on mobility and operability.

As a zoom lens having a wide angle of view and a high zooming ratio, there is known a positive-lead type five-unit zoom lens including five lens units as a whole, in which a lens unit having a positive refractive power is arranged at the end on an object side.

In Japanese Patent Application Laid-Open No. 2011-81065, there is disclosed a five-unit zoom lens including, in order from the object side, a first lens unit having a positive refractive power, a second lens unit having a negative refractive power, a third lens unit having the positive refractive power, a fourth lens unit having the negative refractive power, and a fifth lens unit having the positive refractive power. In Japanese Patent Application Laid-Open No. H10-31157, it is disclosed that the change in interval between the second lens unit and the third lens unit is defined for the purpose of aberration correction. In Japanese Patent Application Laid-Open No. 2011-81065, it is disclosed that the change in interval between the second lens unit and the third lens unit is defined for the purpose of reducing the size and weight of the first lens unit.

SUMMARY OF THE INVENTION

The present invention provides a zoom lens that is capable of achieving both high magnification and reduction in size and weight simultaneously and achieving good optical performance as well.

In order to achieve the object described above, according to one embodiment of the present invention, there is provided a zoom lens, including, in order from an object side to an image side: a first lens unit having a positive refractive power which does not move for zooming; a second lens unit having a negative refractive power which moves during zooming; a third lens unit having a positive refractive power which moves during zooming; a fourth lens unit having a negative refractive power which moves during zooming; and a fifth lens unit having a positive refractive power which does not move for zooming. The first lens unit includes, in order from the object side to the image side, a first sub lens unit having a negative refractive power which does not move for focusing, a second sub lens unit having a positive refractive power which moves during focusing, and a third sub lens unit having a positive refractive power which does not move for focusing. The third sub lens unit includes a negative lens. The following conditions are satisfied:

$$1.6 < L2tm/L2t < 1000.0;$$

$$L2w/L3w < 1.0; \text{ and}$$

$$-0.5 < f2/f3 < -0.05,$$

where $L2t$ represents an interval between the second lens unit and the third lens unit at a telephoto end, $L2tm$ represents an interval between the second lens unit and the third lens unit at a zoom position at which an interval between the third lens unit and the fourth lens unit is minimum, $L2w$ represents an interval between the second lens unit and the third lens unit at a wide-angle end, $L3w$ represents an interval between the third lens unit and the fourth lens unit at the wide-angle end, $f2$ represents a focal length of the second lens unit, and $f3$ represents a focal length of the third lens unit.

According to one embodiment of the present invention, it is possible to provide the zoom lens that is capable of achieving both high magnification and reduction in size and weight simultaneously and achieving good optical performance as well.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A zoom lens according to an embodiment of the present invention is described in detail below with reference to the accompanying drawings.

Figure 1:
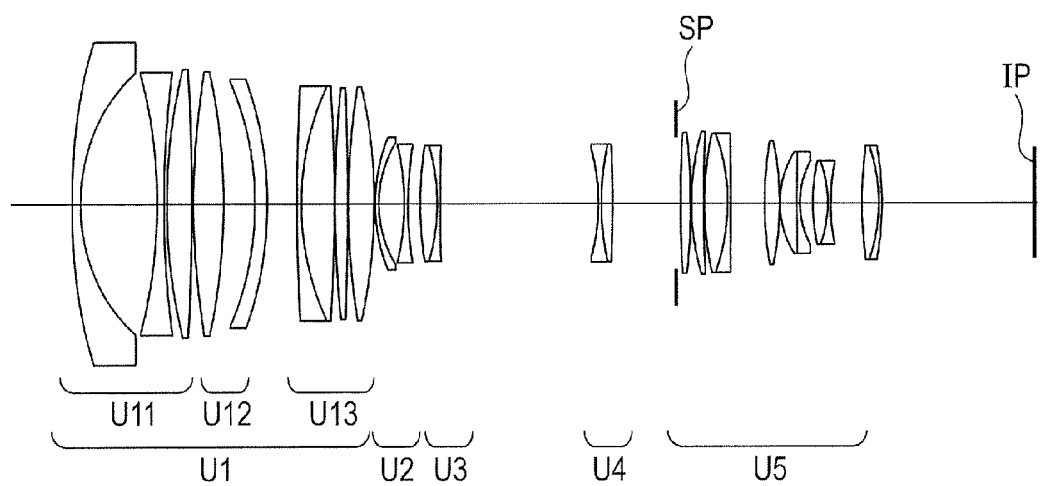
FIG. 1 is a lens sectional view at a wide-angle end of a zoom lens according to Embodiment 1.
Figure 2A:
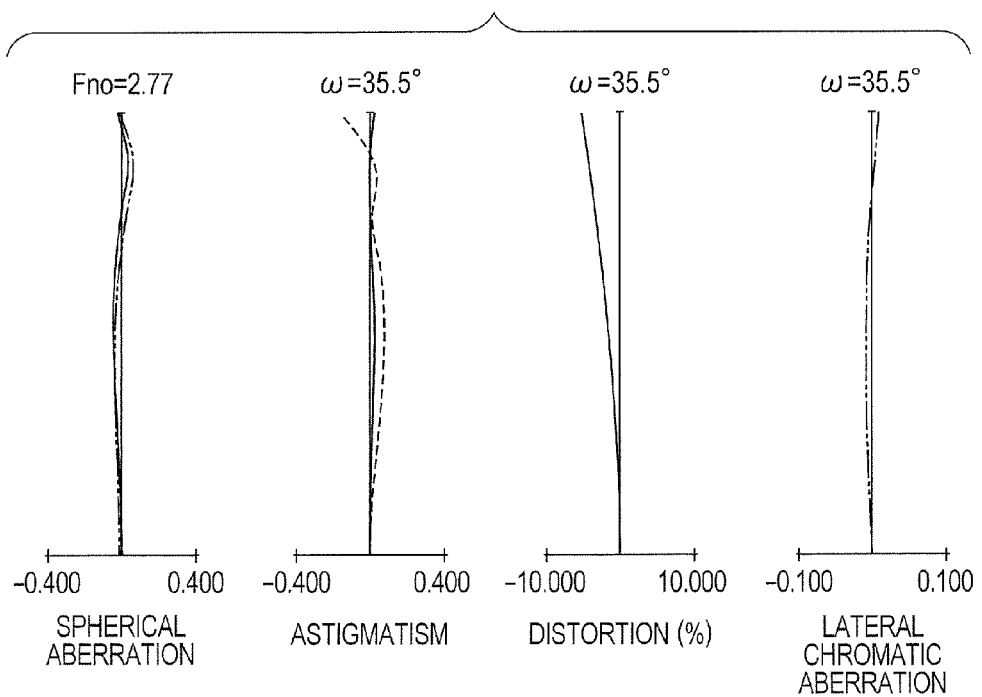
FIG. 2A is an aberration diagram at the wide-angle end of the zoom lens according to Embodiment 1.
Figure 2B:
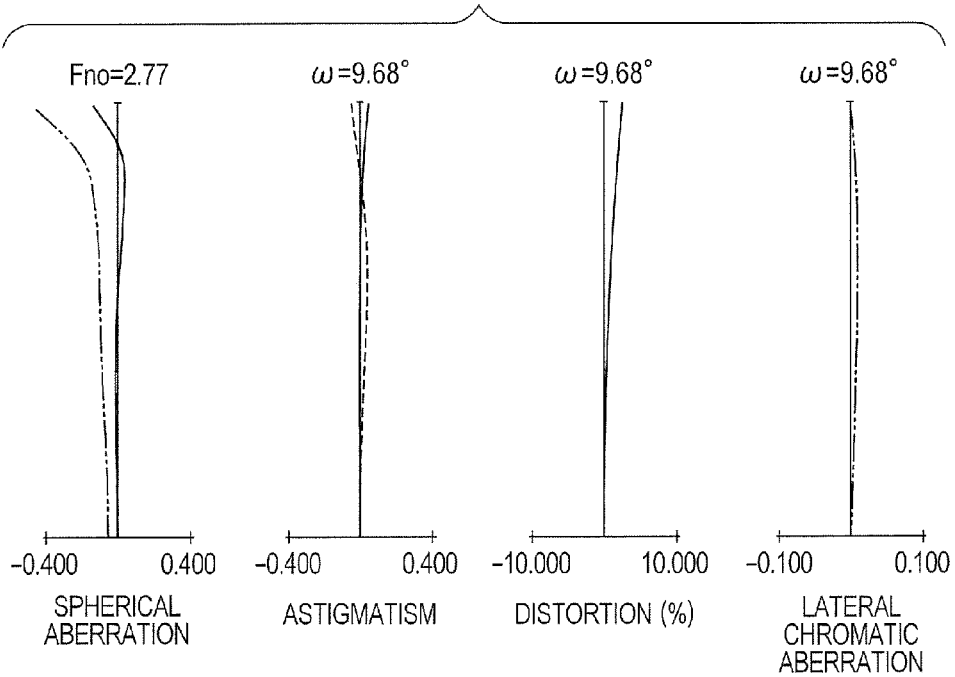
FIG. 2B is an aberration diagram at a focal length of 87.9 mm of the zoom lens according to Embodiment 1.
Figure 2C:
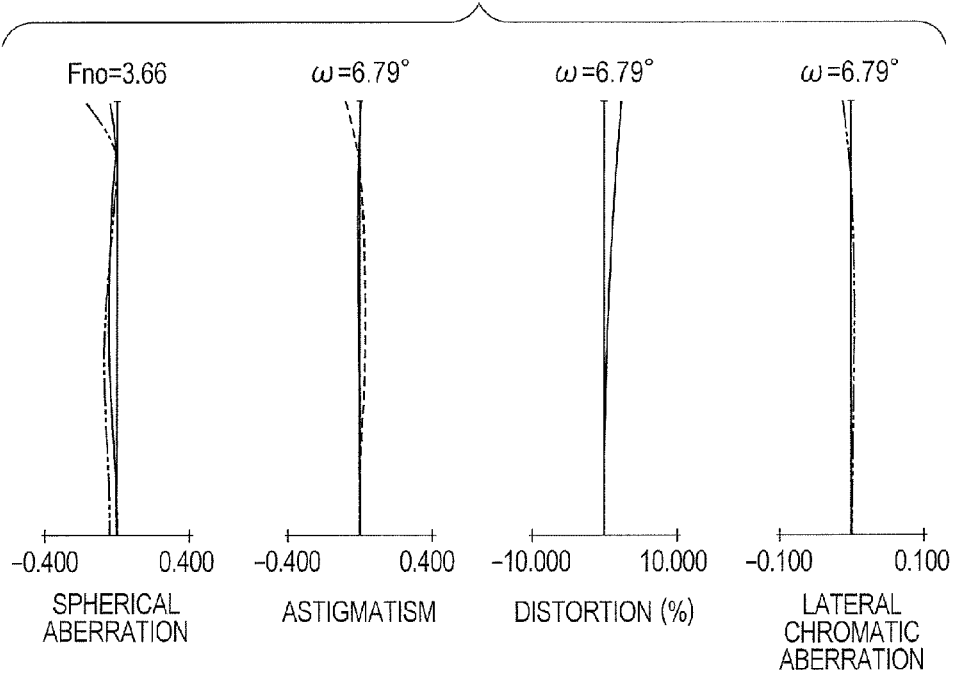
FIG. 2C is an aberration diagram at a telephoto end of the zoom lens according to Embodiment 1.

FIG. 1 is a lens sectional view when focused on an object at infinity at the wide angle end according to Numerical Embodiment 1 as Embodiment 1 of the zoom lens of the present invention. FIGS. 2A, 2B, and 2C are longitudinal aberration diagrams when focused on the object at infinity at the wide angle end, f=87.9 mm, and the telephoto end (long focal length end) according to Numerical Embodiment 1, respectively.

Figure 3:
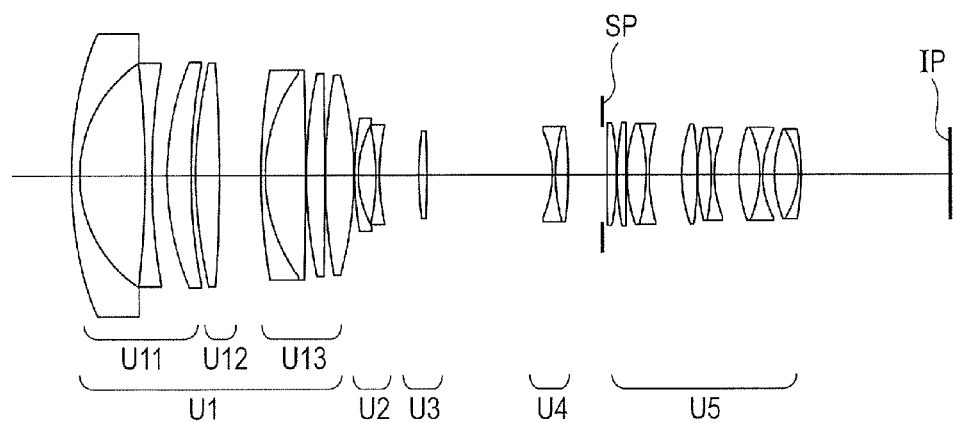
FIG. 3 is a lens sectional view at a wide-angle end of a zoom lens according to Embodiment 2.
Figure 4A:
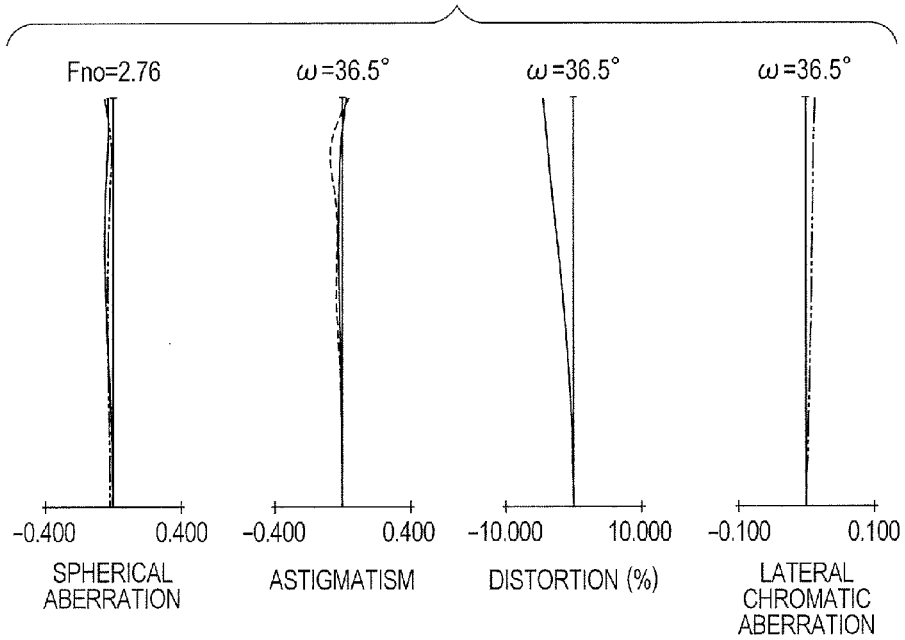
FIG. 4A is an aberration diagram at the wide-angle end of the zoom lens according to Embodiment 2.
Figure 4B:
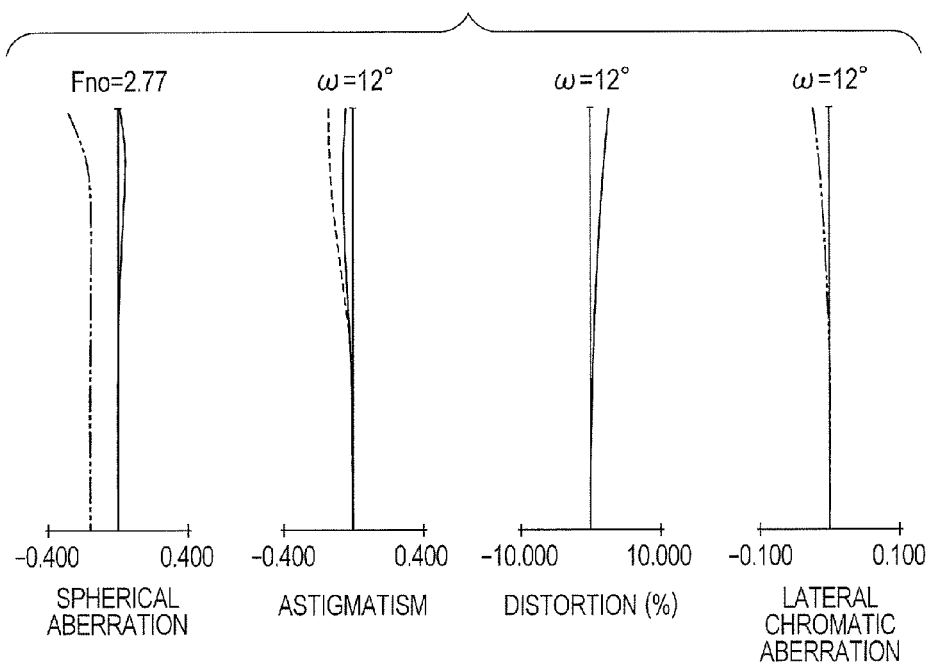
FIG. 4B is an aberration diagram at a focal length of 69.5 mm of the zoom lens according to Embodiment 2.
Figure 4C:
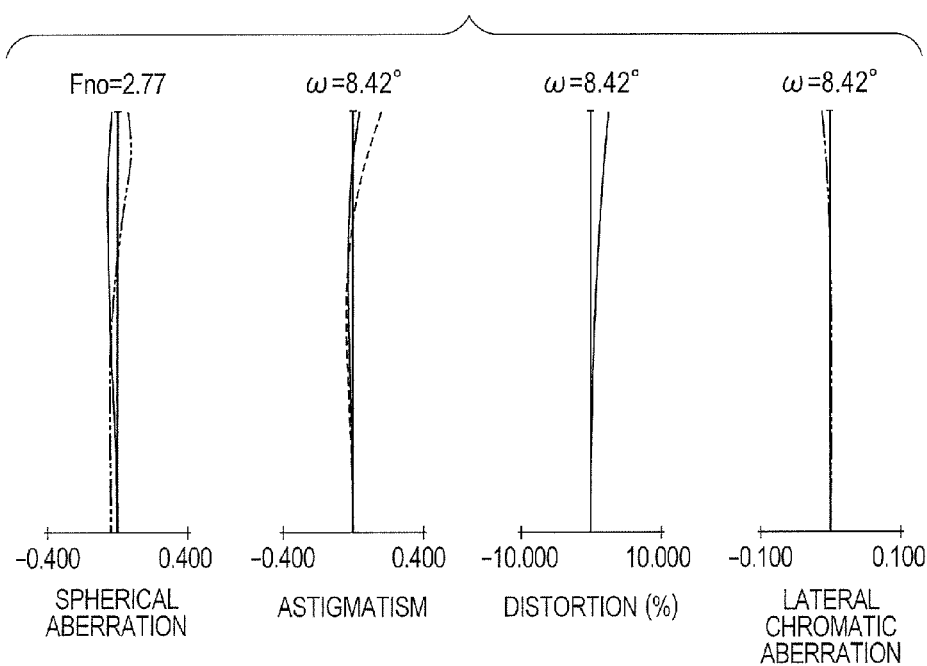
FIG. 4C is an aberration diagram at a telephoto end of the zoom lens according to Embodiment 2.

FIG. 3 is a lens sectional view when focused on an object at infinity at the wide angle end according to Numerical Embodiment 2 as Embodiment 2 of the zoom lens of the present invention. FIGS. 4A, 4B, and 4C are longitudinal aberration diagrams when focused on the object at infinity at the wide angle end, f=69.5 mm, and the telephoto end according to Numerical Embodiment 2, respectively.

Figure 5:
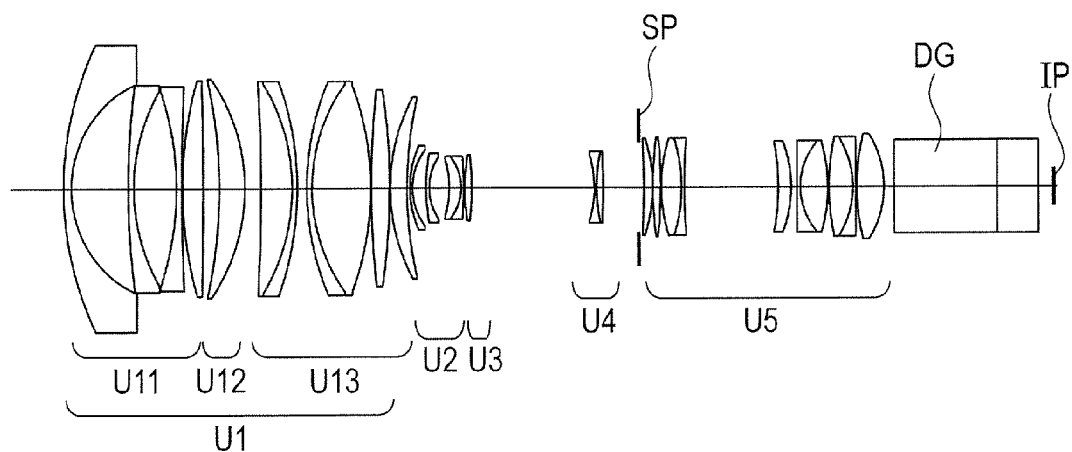
FIG. 5 is a lens sectional view at a wide-angle end of a zoom lens according to Embodiment 3.
Figure 6A:
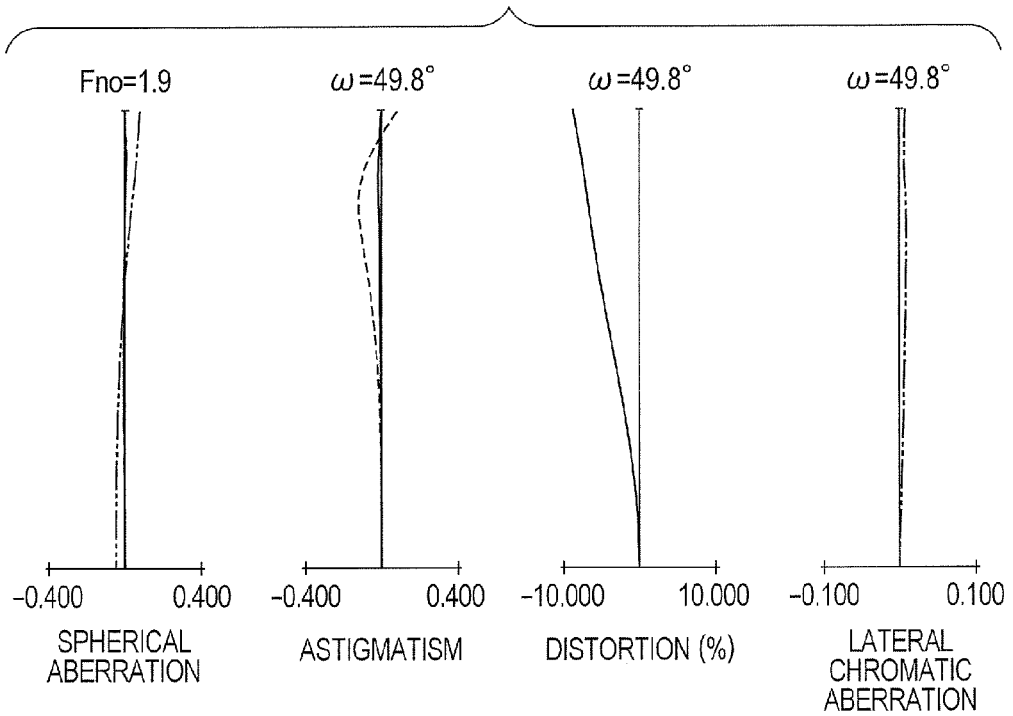
FIG. 6A is an aberration diagram at the wide-angle end of the zoom lens according to Embodiment 3.
Figure 6B:
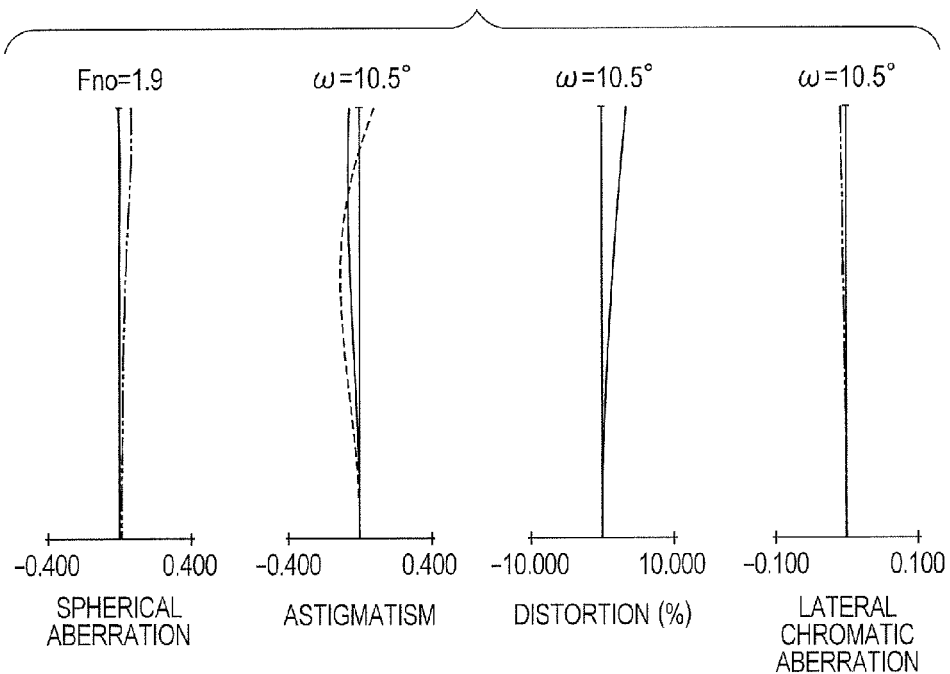
FIG. 6B is an aberration diagram at a focal length of 29.6 mm of the zoom lens according to Embodiment 3.
Figure 6C:
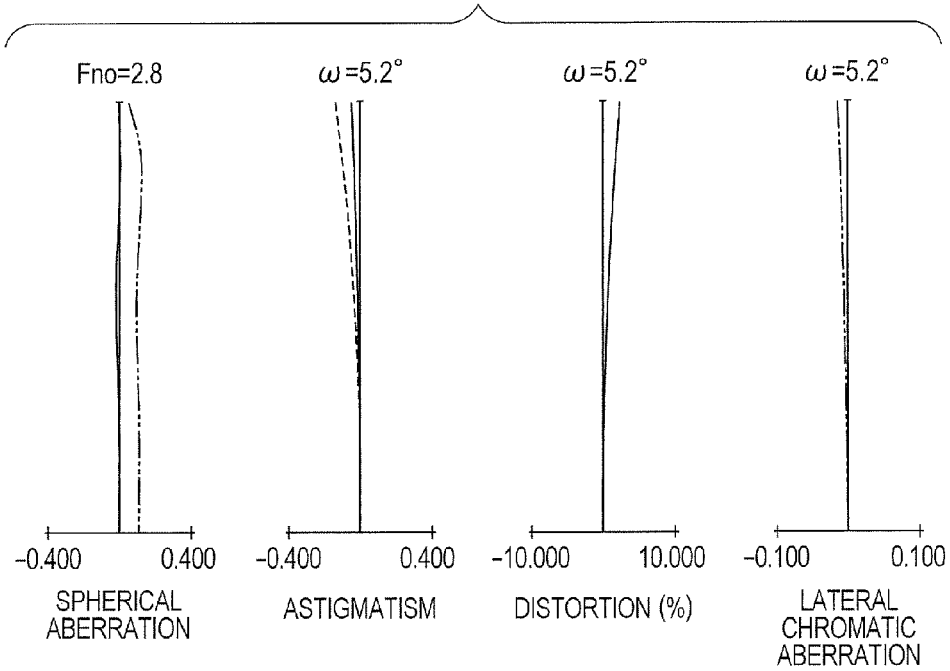
FIG. 6C is an aberration diagram at a telephoto end of the zoom lens according to Embodiment 3.

FIG. 5 is a lens sectional view when focused on an object at infinity at the wide angle end according to Numerical Embodiment 3 as Embodiment 3 of the zoom lens of the present invention. FIGS. 6A, 6B, and 6C are longitudinal aberration diagrams when focused on the object at infinity at the wide angle end, f=29.6 mm, and the telephoto end according to Numerical Embodiment 3, respectively.

Figure 7:
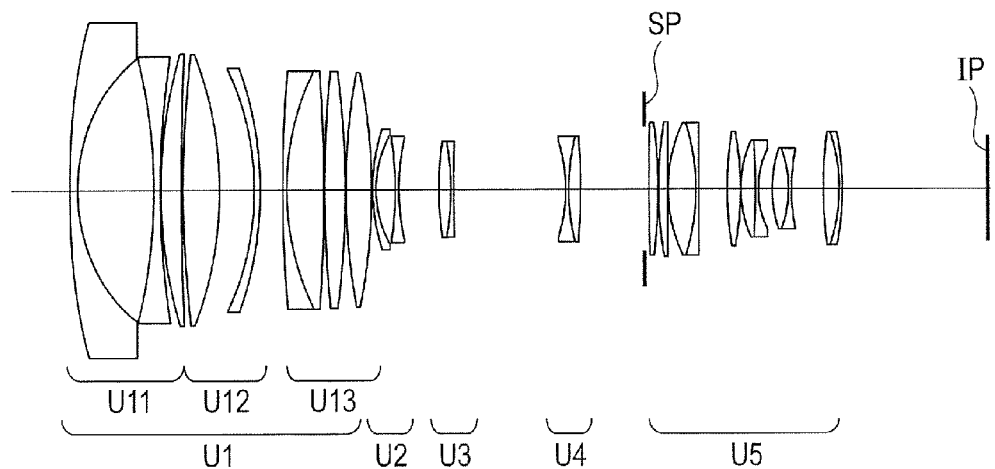
FIG. 7 is a lens sectional view at a wide-angle end of a zoom lens according to Embodiment 4.
Figure 8A:
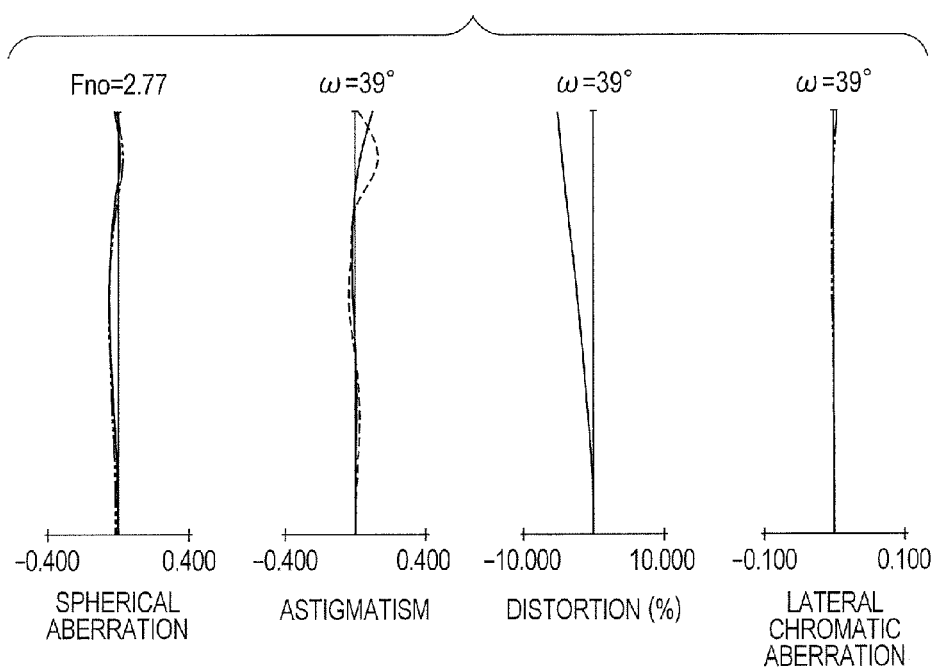
FIG. 8A is an aberration diagram at the wide-angle end of the zoom lens according to Embodiment 4.
Figure 8B:
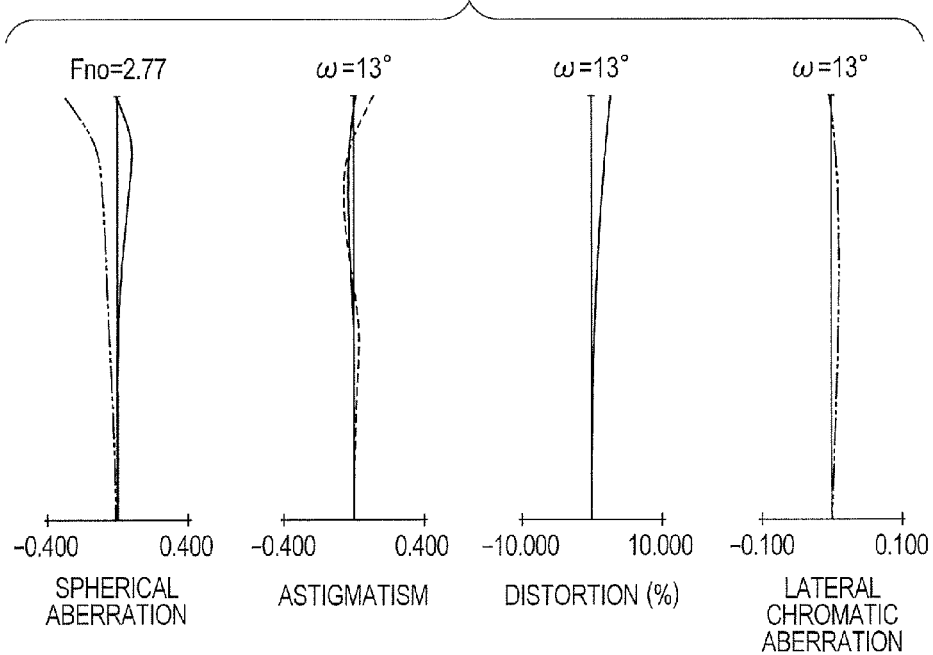
FIG. 8B is an aberration diagram at a focal length of 64.7 mm of the zoom lens according to Embodiment 4.
Figure 8C:
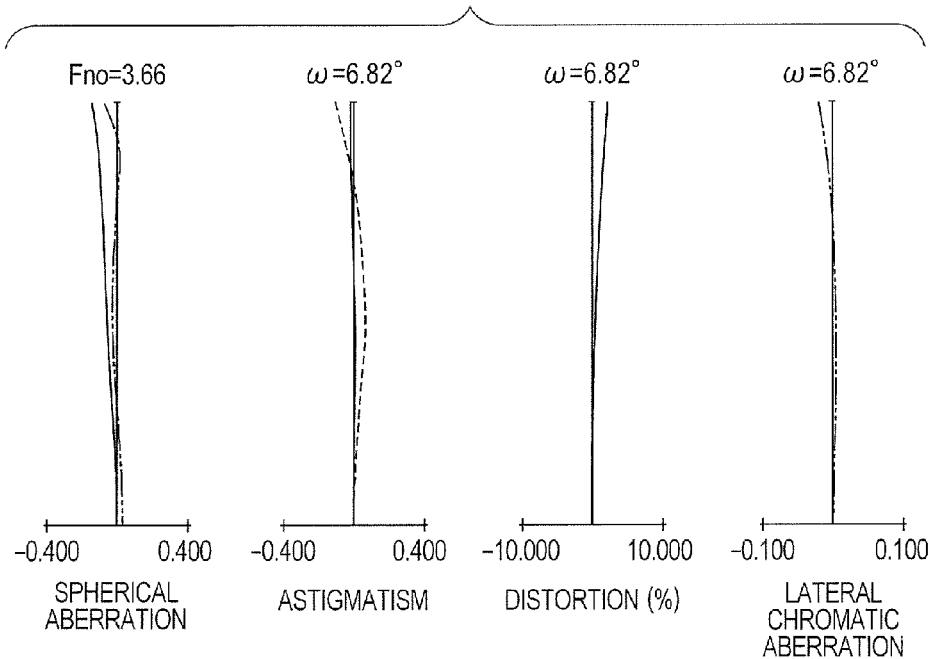
FIG. 8C is an aberration diagram at a telephoto end of the zoom lens according to Embodiment 4.

FIG. 7 is a lens sectional view when focused on an object at infinity at the wide angle end according to Numerical Embodiment 4 as Embodiment 4 of the zoom lens of the present invention. FIGS. 8A, 8B, and 8C are longitudinal aberration diagrams when focused on the object at infinity at the wide angle end, f=64.7 mm, and the telephoto end according to Numerical Embodiment 4, respectively.

In each longitudinal aberration diagram, spherical aberration is illustrated with respect to e-line (represented with a solid line) and g-line (represented with a chain double-dashed line). Astigmatism is illustrated on a meridional image plane (represented with a broken line) with respect to e-line and a sagittal image plane (represented with a solid line) with respect to e-line. Lateral chromatic aberration is illustrated with respect to g-line (represented with a chain double-dashed line). An F-number is represented by Fno and a half angle of field is represented by ω. In the longitudinal aberration diagram, spherical aberration, astigmatism, distortion, and lateral chromatic aberration are illustrated in scales of 0.4 mm, 0.4 mm, 10%, and 0.1 mm, respectively.

The zoom lens according to the present invention has the following features. The zoom lens includes, in order from an object side to an image side: a first lens unit having a positive refractive power which does not move for zooming; a second lens unit having a negative refractive power which moves during zooming; a third lens unit having the positive refractive power which moves during zooming; a fourth lens unit having the negative refractive power which moves during zooming; and a fifth lens unit having the positive refractive power which does not move for zooming.

The first lens unit includes, in order from the object side to the image side, a first sub lens unit having the negative refractive power which does not move for focusing, a second sub lens unit having the positive refractive power which moves along an optical axis during focusing, and a third sub lens unit having the positive refractive power which does not move for focusing. The third sub lens unit includes at least one negative lens.

Conditional Expressions described below are satisfied:

$$1.6 < L2tm/L2t < 1000.0 \quad (1)$$

$$L2w/L3w < 1.0 \quad (2)$$

$$-0.5 < f2/f3 < -0.05 \quad (3)$$

where L2t represents an interval between the second lens unit and the third lens unit at the telephoto end, L2tm represents an interval between the second lens unit and the third lens unit at a zoom position at which an interval between the third lens unit and the fourth lens unit is minimum, L2w represents an interval between the second lens unit and the third lens unit at the wide-angle end, L3w represents an interval between the third lens unit and the fourth lens unit at the wide-angle end, and f2 and f3 represent focal lengths of the second lens unit and the third lens unit, respectively.

Note that, the "interval between the i-th lens unit and the (i+1)th lens unit" as used herein specifically refers to the "interval on the optical axis between a surface of the i-th lens unit at the end on the image side to a surface of the (i+1)th lens unit at the end on the object side."

In the five-unit zoom lens of the present invention, the following expression is satisfied:

$$fm = f1 \times (\beta 2m \times \beta 3m \times \beta 4m \times \beta 5m) \quad (X)$$

where fm represents a focal length at a predetermined zoom position m, f1 represents a focal length of the first lens unit, and βNm represents a lateral magnification at the zoom position m of the N-th lens unit (N=1 to 5), provided that each of the lateral magnification and the focal length is a value at object distance infinity.

In addition, as the zoom lens, it is required to satisfy a condition that an image point obtained by a zooming unit is constant regardless of zooming.

In the present invention, the fifth lens unit does not move during zooming, and hence the lateral magnification β5m does not vary during zooming. The condition for obtaining the predetermined fm, (β2m×β3m×β4m), is not uniquely determined. Therefore, the moving locus of each zoom movable lens unit is arbitrarily changeable within a predetermined range.

The power arrangement of a fourth lens unit U4 when an interval between a second lens unit U2 and a third lens unit U3 is changed at the zoom position m in the five-unit zoom lens of the present invention is described below.

In general, a combined focal length fab of a lens "a" and a lens "b" having focal lengths of fa and fb, respectively, is expressed by Expression (Y):

$$1/fab = 1/fa + 1/fb - e' \times 1/fa \times 1/fb \quad (Y)$$

where e' represents a principal point interval between lenses.

Based on Expression (Y), under a condition in which fa is negative, fb is positive, and the combined focal length fab is negative, when e' increases, the absolute value of fab increases, while when e' decreases, the absolute value of fab decreases.

Further, a paraxial imaging relationship of the lens is expressed by Expression (Z):

$$1/s' = 1/s + 1/f \quad (Z)$$

where f represents a focal length of a lens, s represents a coordinate of an object point of the lens, and s' represents a coordinate of an image point of the lens.

Figure 9:
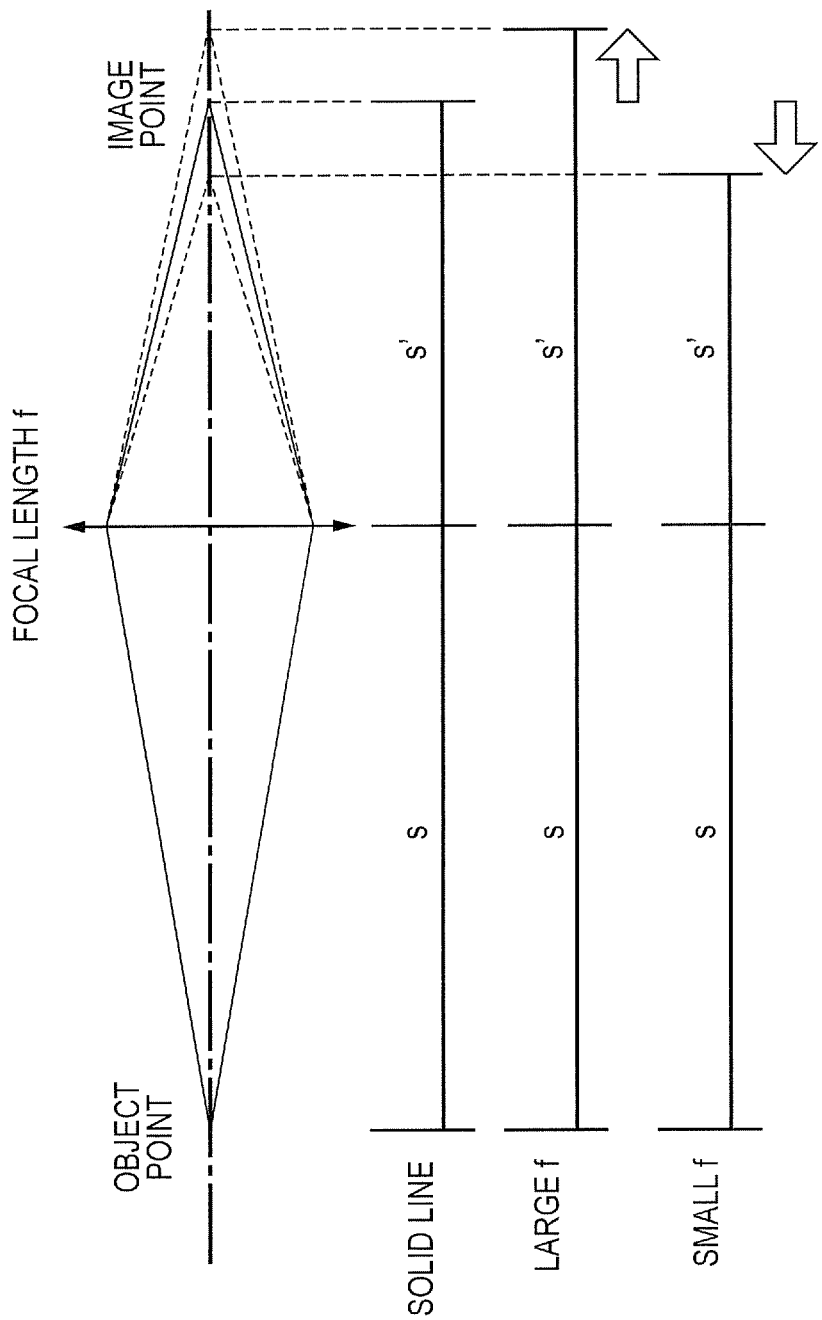
FIG. 9 is a schematic diagram of a paraxial imaging relationship for describing the present invention.

Based on FIG. 9 and Expression (Z), in a case of f<0, s>0, and |s|>|f| (in a case of s'<0), when the absolute value of f is increased, the absolute value of s' increases, while when the absolute value of f is decreased, the absolute value of s' decreases. FIG. 9 is a schematic view of a case of s<0 and f>0, which satisfies Expression (Z), and hence the relationship among f, s, s' does not change.

In the present invention, the combined focal length of U2 and U3 from the wide-angle end to the telephoto end is negative, and regarding the combined lens of U2 and U3, the object point is on the image side (s>0) and the image point is on the object side (s'<0). Therefore, when the interval between U2 and U3 is increased, the absolute value of the combined focal length of U2 and U3 increases based on Expression (Y). Therefore, the image point obtained by U2 and U3 moves toward the object side based on Expression (Z). At this time, in order to correct the image point as the zoom lens, U4 is moved toward the image side. Similarly, when the interval between U2 and U3 is decreased, U4 is moved toward the object side.

Figure 11:
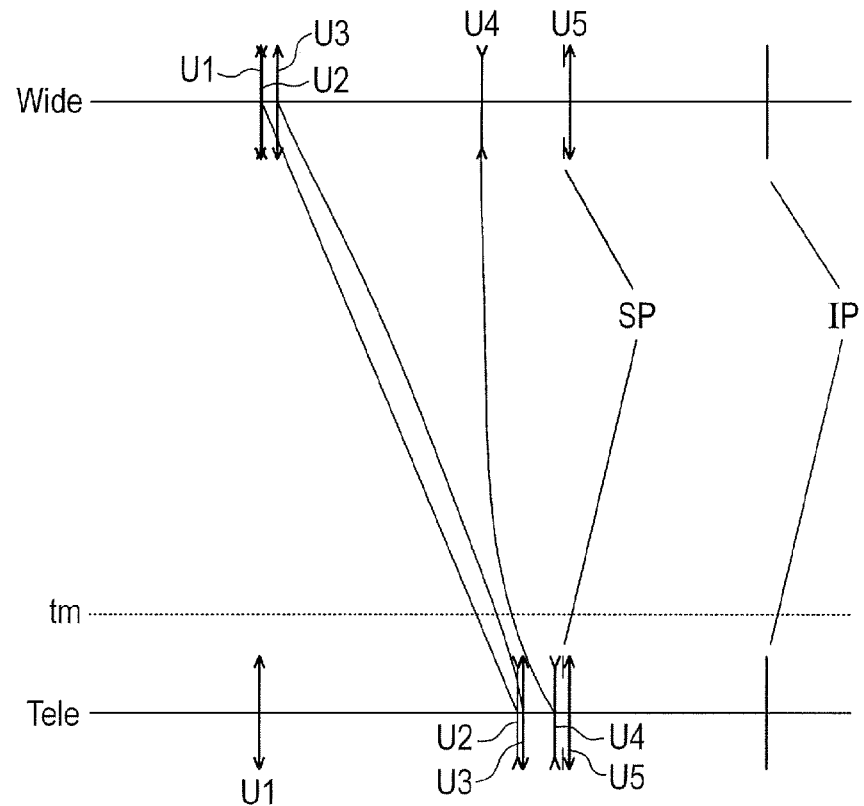
FIG. 11 is a schematic diagram illustrating loci during zooming of the present invention.

In view of this, in the present invention, the lenses are arranged so that the interval between U2 and U3 decreases at the telephoto end while increasing the interval between U2 and U3 at a zoom position tm at which U3 and U4 most approach each other. With this, U4 is located on the image side in an arrangement in which U3 and U4 most approach each other, and thus the interval between U3 and U4 can be appropriately held. Further, U4 is prevented from being fed on the image side at the telephoto end, and an interval between U4 and a fifth lens unit U5 at the telephoto end can be reduced. Specifically, loci as illustrated in FIG. 11 are taken. With the above-mentioned lens arrangement, both of high magnification and reduction in size and weight of the entire system can be achieved simultaneously.

The five-unit zoom lens of the present invention employs a so-called three lens unit inner focus type as a focusing system. The three lens unit inner focus type refers to a system in which a first lens unit U1 includes, in order from the object side, a first sub lens unit U11 having the negative refractive power, a second sub lens unit U12 having the positive refractive power, and a third sub lens unit U13 having the positive refractive power, and the second sub lens unit U12 is moved for focusing. During focusing, the first sub lens unit U11 and the third sub lens unit U13 do not move, and the second sub lens unit U12 moves from the object side to the image side to perform a focusing operation from an infinity object to a close object. It is known that, with use of the three lens unit inner focus type, there is an effect of suppressing aberration variation during zooming and focusing. Further, when the third sub lens unit U13 having the positive refractive power includes at least one negative lens, zooming variation of chromatic aberration can be effectively corrected.

Figure 10A:
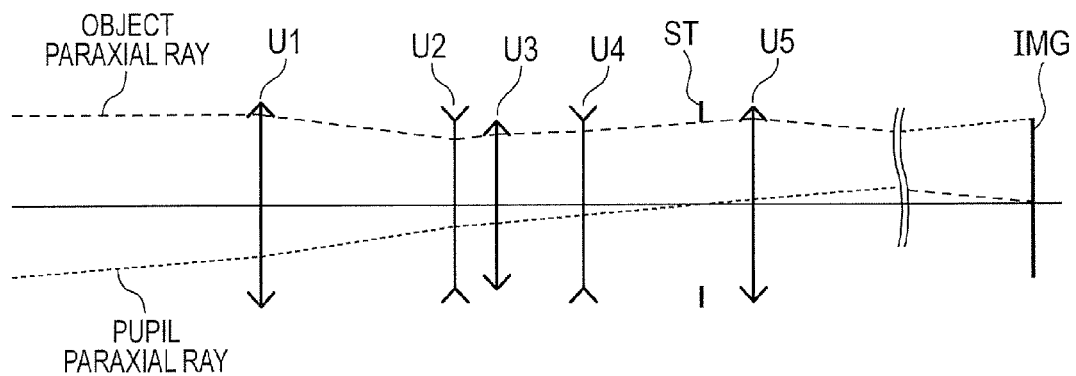
FIG. 10A is a schematic diagram of a paraxial imaging relationship of the present invention.
Figure 10B:
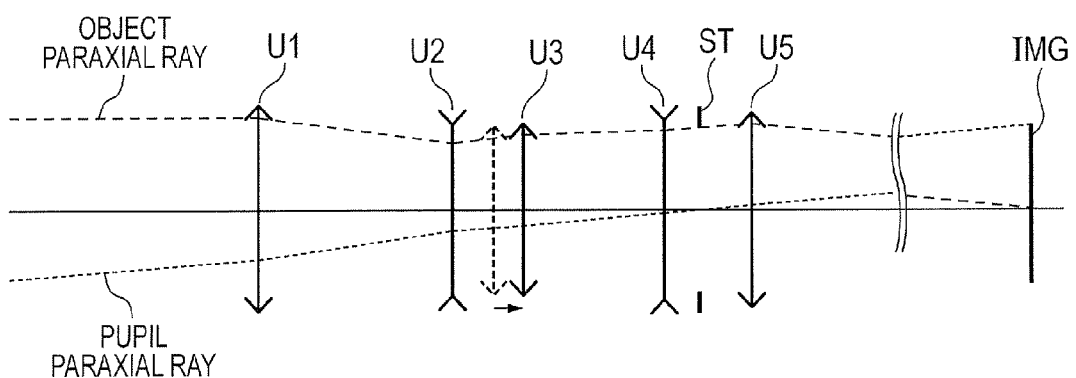
FIG. 10B is a schematic diagram of the paraxial imaging relationship of the present invention.
Figure 10C:
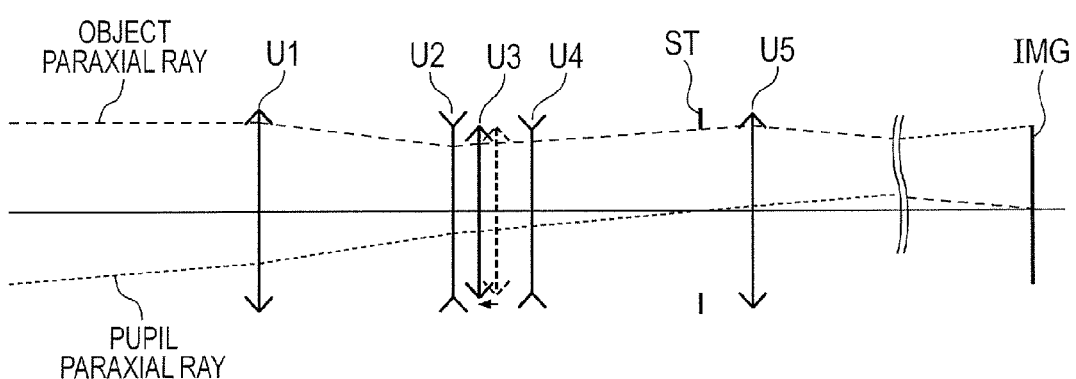
FIG. 10C is a schematic diagram of the paraxial imaging relationship of the present invention.

The power arrangement in the present invention is described with reference to schematic diagrams. FIGS. 10A, 10B, and 10C are schematic diagrams illustrating paraxial ray tracing of the present invention. The arrows in FIGS. 10A, 10B, and 10C represent the first lens unit U1, the second lens unit U2, the third lens unit U3, the fourth lens unit U4, and the fifth lens unit U5. The broken lines represent an object paraxial ray, and the dotted lines represent a pupil paraxial ray. ST and IMG represent a stop and an image plane, respectively. FIGS. 10A, 10B, and 10C represent that the arrangement of the third lens unit U3 and the fourth lens unit U4 differs when the second lens unit U2 is located at the same position on the optical axis. Relative to FIG. 10A, in FIG. 10B, the third lens unit U3 is moved on the image side, and the interval between the second lens unit U2 and the third lens unit U3 is larger. At this time, as illustrated in FIG. 10B, the fourth lens unit U4 is located on the image side relative to FIG. 10A. Further, relative to FIG. 10A, in FIG. 10C, the third lens unit U3 is moved on the object side, and the interval between the second lens unit U2 and the third lens unit U3 is smaller. At this time, as illustrated in FIG. 10C, the fourth lens unit U4 is located on the object side relative to FIG. 10A.

Conditional Expression (1) relates to a ratio of the interval L2t between the second lens unit and the third lens unit at the telephoto end to the interval L2tm between the second lens unit and the third lens at the zoom position tm at which the third lens unit and the fourth lens unit most approach each other during zooming. By satisfying Conditional Expression (1), both of high magnification and reduction in size and weight of the entire system can be achieved simultaneously.

When the ratio exceeds the upper limit of Conditional Expression (1), the interval between the second lens unit and the third lens unit at the telephoto end becomes too small, and the lens units may interfere with each other when the lens units are driven at high speed, which is not preferred in terms of manufacture. When the ratio falls below the lower limit of Conditional Expression (1), the interval between the second lens unit and the third lens unit at the telephoto end becomes too large, and the fourth lens unit is excessively arranged on the image side. With this, the moving amount of the fourth lens unit on the image side increases during zooming, and it is necessary to secure a space for driving the movable lens unit to achieve high magnification, which adversely affects the achievement of reduction in size and weight of the entire system and hence is not preferred. Further, the interval between the second lens unit and the third lens unit at the zoom position at which the third lens unit and the fourth lens unit most approach each other becomes too small. Therefore, it is necessary to take a large interval between the third lens unit and the fourth lens unit in order to prevent interference between the third lens unit and the fourth lens unit, which adversely affects the achievement of reduction in size and weight of the entire system and hence is not preferred.

Conditional Expression (2) relates to a ratio of the interval L2w between the second lens unit and the third lens unit at the wide-angle end to the interval L3w between the third lens unit and the fourth lens unit at the wide-angle end. By satisfying Conditional Expression (2), the interval between the second lens unit and the third lens unit decreases at the wide-angle end, and the moving amount of the fourth lens unit can be suppressed on the telephoto side.

Conditional Expression (3) relates to a ratio of the focal length f2 of the second lens unit to the focal length f3 of the third lens unit. By satisfying Conditional Expression (3), both of high magnification and reduction in size and weight of the entire system can be achieved simultaneously, and high optical performance can be obtained as well. When the ratio exceeds the upper limit of Conditional Expression (3), the absolute value of the focal length of the second lens unit becomes too small, and hence the refractive power of the second lens unit becomes too large. Therefore, the aberration variation during zooming becomes too large, which is not preferred. When the ratio falls below the lower limit of Conditional Expression (3), the absolute value of the focal length of the second lens unit becomes too large, which adversely affects the achievement of high magnification and hence is not preferred. Further, the focal length of the third lens unit becomes too small. Therefore, the aberration variation during zooming becomes too large, which is not preferred.

Conditional Expressions (1) to (3) are further preferred to be set as follows.

$$3.0 < L2tm/L2t < 10.00 \quad (1a)$$

$$L2w/L3w < 0.5 \quad (2a)$$

$$-0.4 < f2/f3 < -0.1 \quad (3a)$$

Further, it is preferred that at least one of the following conditions be satisfied:

$$L2w/L2tm < 1.6 \quad (4)$$

$$-20.0 < f4/fw < -2.0 \quad (5)$$

$$-3.0 < f2/fw < -0.7 \quad (6)$$

where f4 represents a focal length of the fourth lens unit, and fw represents a focal length of the entire system at the wide-angle end.

Conditional Expression (4) relates to a ratio of the interval L2w between the second lens unit and the third lens unit at the wide-angle end to the interval L2tm between the second lens unit and the third lens unit at the zoom position tm at which the third lens unit and the fourth lens unit most approach each other during zooming. By satisfying Conditional Expression (4), both of high magnification and reduction in size and weight of the entire system can be achieved simultaneously. When the ratio exceeds the upper limit of Conditional Expression (4), the interval between the second lens unit and the third lens unit at the wide-angle end becomes too large, and the absolute value of the combined focal length of the second lens unit and the third lens unit becomes too large, which adversely affects the achievement of high magnification and hence is not preferred.

Conditional Expression (5) relates to a ratio of the focal length f4 of the fourth lens unit to the focal length fw of the entire system at the wide-angle end. By satisfying Conditional Expression (5), both of high magnification and reduction in size and weight of the entire system can be achieved simultaneously, and high optical performance can be obtained as well. When the ratio exceeds the upper limit of Conditional Expression (5), the absolute value of the focal length of the fourth lens unit becomes too small, and hence the refractive power of the fourth lens unit becomes too large. Therefore, the aberration variation during zooming becomes too large, which is not preferred. When the ratio falls below the lower limit of Conditional Expression (5), the absolute value of the focal length of the fourth lens unit becomes too large, and hence it is required to move the fourth lens unit largely for correcting the image point during zooming, which adversely affects the achievement of reduction in size and weight and high magnification and hence is not preferred.

Conditional Expression (6) relates to a ratio of the focal length f2 of the second lens unit to the focal length fw of the entire system at the wide-angle end. By satisfying Conditional Expression (6), both of high magnification and reduction in size and weight of the entire system can be achieved simultaneously, and high optical performance can be obtained as well. When the ratio exceeds the upper limit of Conditional Expression (6), the absolute value of the focal length of the second lens unit becomes too small, and hence the refractive power of the second lens unit becomes too large. Therefore, the aberration variation during zooming becomes too large, which is not preferred. When the ratio falls below the lower limit of Conditional Expression (6), the absolute value of the focal length of the second lens unit becomes too large. In order to achieve high magnification, it is required to move the second lens unit largely during zooming, which adversely affects the achievement of reduction in size and weight and hence is not preferred.

Conditional Expressions (4) to (6) are further preferred to be set so that at least one of the following conditions is satisfied.

$$L2w/L2tm < 1.5 \quad (4a)$$

$$-12.0 < f4/fw < -2.5 \quad (5a)$$

$$-2.5 < f2/fw < -1.0 \quad (6a)$$

Further, the third lens unit U3 is preferred to include a lens including at least one negative lens and one positive lens. By using a concave lens and a convex lens in the third lens unit U3, the variations of various aberrations during zooming, particularly, variation of chromatic aberration can be easily corrected effectively.

Hereinafter, features of the lens configurations of Numerical Embodiments 1 to 4 of the zoom lens of the present invention are described. In the lens sectional view of each embodiment, IP represents an image plane, which corresponds to an imaging plane of a solid state image pickup element.

Embodiment 1

The zoom lens of Embodiment 1 is described mainly focusing on the first lens unit U1 of a three lens unit inner focus type, and the second lens unit U2, the third lens unit U3, and the fourth lens unit U4, which are lens units which move during zooming.

The first lens unit U1 corresponds to a first lens surface to a seventeenth lens surface in Numerical Embodiment 1, and includes, in order from the object side, the first sub lens unit U11, the second sub lens unit U12, and the third sub lens unit U13. U12 corresponds to a seventh lens surface to a tenth lens surface in Numerical Embodiment 1. U13 includes one negative lens.

The second lens unit U2 corresponds to an eighteenth lens surface to a twenty-first lens surface in Numerical Embodiment 1, and includes two negative lenses.

The third lens unit U3 corresponds to a twenty-second lens surface to a twenty-fourth lens surface in Numerical Embodiment 1, and includes, in order from the object side to the image side, a cemented lens obtained by cementing a positive lens and a negative lens in the stated order.

The fourth lens unit U4 corresponds to a twenty-fifth lens surface to a twenty-seventh lens surface in Numerical Embodiment 1, and includes, in order from the object side to the image side, a cemented lens obtained by cementing a negative lens and a positive lens in the stated order.

Aspherical surfaces are used for an object-side surface (first lens surface) of a first lens that is a lens located at the end on the object side in the first sub lens unit U11, and for an object-side surface (seventh lens surface) of a fourth lens that is a lens surface located at the end on the object side in the second sub lens unit U12. The aspherical surfaces mainly correct the distortion and field curvature on the wide-angle side and correct the aberration variation during focusing.

Values corresponding to the respective conditional expressions of Embodiment 1 are shown in Table 1. Numerical Embodiment 1 satisfies all of the conditional expressions, and realizes a zoom lens capable of achieving wide angle of view, high magnification, and reduction in size and weight, and achieving good optical performance as well.

Note that, the cemented lens of the present invention may be a separated lens having a slight air interval. This is within the assumption of modification and change as a lens shape in the present invention, and the same holds true for all of the following embodiments.

Embodiment 2

The zoom lens of Embodiment 2 is described mainly focusing on the first lens unit U1 of the three lens unit inner focus type, and the second lens unit U2, the third lens unit U3, and the fourth lens unit U4, which are lens units which move during zooming.

The first lens unit U1 corresponds to the first lens surface to a fifteenth lens surface in Numerical Embodiment 2, and includes, in order from the object side, the first sub lens unit U11, the second sub lens unit U12, and the third sub lens unit U13. The second sub lens unit U12 corresponds to the seventh lens surface to an eighth lens surface in Numerical Embodiment 2. The third sub lens unit U13 includes one negative lens.

The second lens unit U2 corresponds to a sixteenth lens surface to a nineteenth lens surface in Numerical Embodiment 2, and includes two negative lenses.

The third lens unit U3 corresponds to a twentieth lens surface to a twenty-first lens surface in Numerical Embodiment 2, and includes one positive lens.

The fourth lens unit U4 corresponds to a twenty-second lens surface to a twenty-fourth lens surface in Numerical Embodiment 2, and includes, in order from the object side to the image side, a cemented lens obtained by cementing a negative lens and a positive lens in the stated order.

Aspherical surfaces are used for the object-side surface (first lens surface) of the first lens that is the lens located at the end on the object side in the first sub lens unit U11, and for the object-side surface (seventh lens surface) of the fourth lens that is the lens surface located at the end on the object side in the second sub lens unit U12. The aspherical surfaces mainly correct the distortion and field curvature on the wide-angle side and correct the aberration variation during focusing.

Values corresponding to the respective conditional expressions of Embodiment 2 are shown in Table 1. Numerical Embodiment 2 satisfies all of the conditional expressions, and further, the third lens unit serving as a movable lens unit includes one positive lens. With this, Numerical Embodiment 2 realizes a zoom lens capable of achieving further reduction in size and weight, and achieving wide angle of view, high magnification, and good optical performance as well.

Embodiment 3

The zoom lens of Embodiment 3 is described mainly focusing on the first lens unit U1 of the three lens unit inner focus type, and the second lens unit U2, the third lens unit U3, and the fourth lens unit U4, which are lens units which move during zooming.

The first lens unit U1 corresponds to the first lens surface to the twentieth lens surface in Numerical Embodiment 3, and includes, in order from the object side, the first sub lens unit U11, the second sub lens unit U12, and the third sub lens unit U13. U12 corresponds to the ninth lens surface to the tenth lens surface in Numerical Embodiment 3. U13 includes two negative lenses.

The second lens unit U2 corresponds to the twenty-first lens surface to the twenty-seventh lens surface in Numerical Embodiment 3, and includes, in order from the object side to the image side, two negative lenses and the cemented lens obtained by cementing the positive lens and the negative lens in the stated order.

The third lens unit U3 corresponds to a twenty-eighth lens surface to a twenty-ninth lens surface in Numerical Embodiment 3, and includes one positive lens.

The fourth lens unit U4 corresponds to a thirtieth lens surface to a thirty-second lens surface in Numerical Embodiment 3, and includes, in order from the object side to the image side, the cemented lens obtained by cementing the negative lens and the positive lens in the stated order.

An aspherical surface is used for an image-side surface (tenth lens surface) of a fifth lens that is a lens constituting the second sub lens unit U12. The aspherical surface mainly corrects the distortion and field curvature on the wide-angle side.

Values corresponding to the respective conditional expressions of Embodiment 3 are shown in Table 1. Numerical Embodiment 3 satisfies all of the conditional expressions, and further, the third lens unit that is the movable lens unit includes one positive lens. With this, a zoom lens capable of achieving further reduction in size and weight, and achieving wide angle of view, high magnification, and good optical performance as well is realized.

Embodiment 4

The zoom lens of Embodiment 4 is described mainly focusing on the first lens unit U1 of the three lens unit inner focus type, and the second lens unit U2, the third lens unit U3, and the fourth lens unit U4, which are lens units which move during zooming.

The first lens unit U1 corresponds to the first lens surface to the seventeenth lens surface in Numerical Embodiment 4, and includes, in order from the object side, the first sub lens unit U11, the second sub lens unit U12, and the third sub lens unit U13. U12 corresponds to the seventh lens surface to the tenth lens surface in Numerical Embodiment 4. U13 includes one negative lens.

The second lens unit U2 corresponds to the eighteenth lens surface to the twenty-first lens surface in Numerical Embodiment 4, and includes two negative lenses.

The third lens unit U3 corresponds to the twenty-second lens surface to the twenty-fourth lens surface in Numerical Embodiment 4, and includes, in order from the object side to the image side, the cemented lens obtained by cementing the positive lens and the negative lens in the stated order.

The fourth lens unit U4 corresponds to the twenty-fifth lens surface to the twenty-seventh lens surface in Numerical Embodiment 4, and includes, in order from the object side to the image side, the cemented lens obtained by cementing the negative lens and the positive lens in the stated order.

Aspherical surfaces are used for the object-side surface (first lens surface) of the first lens that is the lens located at the end on the object side in the first sub lens unit U11, and for the object-side surface (seventh lens surface) of the fourth lens that is the lens surface located at the end on the object side in the second sub lens unit U12. The aspherical surfaces mainly correct the distortion and field curvature on the wide-angle side and correct the aberration variation during focusing.

Values corresponding to the respective conditional expressions of Embodiment 4 are shown in Table 1. Numerical Embodiment 4 satisfies all of the conditional expressions, and realizes a zoom lens capable of achieving wide angle of view, high magnification, and reduction in size and weight, and achieving good optical performance as well.

Figure 12:
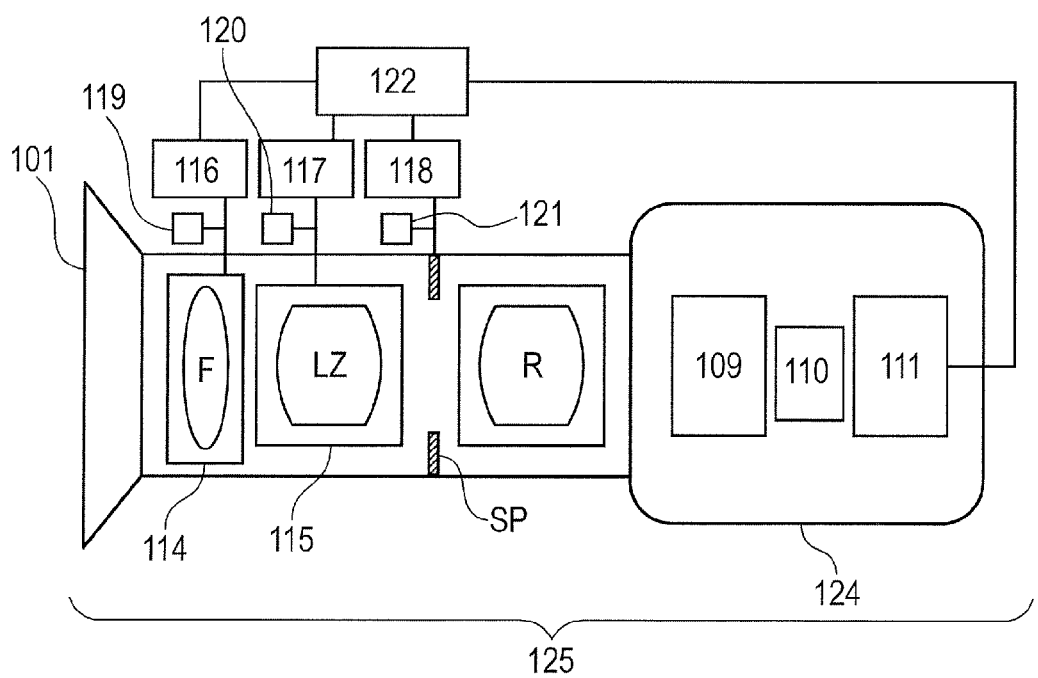
FIG. 12 is a schematic diagram of a main part of an image pickup apparatus of the present invention.

FIG. 12 is a schematic diagram of a main part of an image pickup apparatus (television camera system) using the zoom lens according to each of Embodiments 1 to 4 of the present invention as a photographing optical system. In FIG. 12, an image pickup apparatus 125 includes a zoom lens 101 according to any one of Embodiments 1 to 4, and a camera 124. The zoom lens 101 is removably attached to the camera 124. The camera 124 attached with the zoom lens 101 constitutes the image pickup apparatus 125. The zoom lens 101 includes a first lens unit F, a zoom portion LZ, and a fifth lens unit R for imaging. The first lens unit F includes a lens unit for focusing.

The zoom portion LZ includes the second lens unit and the third lens unit which move on the optical axis for zooming, and the fourth lens unit which moves on the optical axis for correcting the image plane variation accompanying the zooming. The aperture stop is denoted by SP. The fifth lens unit R includes lens units IE' and IE which can be inserted into and removed from an optical path. The lens units IE and IE' are switched to displace the focal length range of the entire system of the zoom lens 101. Drive mechanisms 114 and 115, such as a helicoid and a cam, drive the first lens unit F and the zoom portion LZ in an optical axis direction, respectively. Motors (drive units) 116 to 118 electrically drive the drive mechanisms 114 and 115 and the aperture stop SP.

Detectors 119 to 121, such as an encoder, a potentiometer, or a photo-sensor, are configured to detect the positions of the first lens unit F and the zoom portion LZ on the optical axis, and the aperture diameter of the aperture stop SP. The camera 124 includes a glass block 109, which corresponds to an optical filter or a color separation optical system provided within the camera 124. Further, the camera 124 includes a solid state image pickup element (photoelectric transducer) 110, such as a charge-coupled device (CCD) sensor or a complementary metal-oxide semiconductor (CMOS) sensor. The solid state image pickup element 110 is configured to receive a subject image formed by the zoom lens 101. Further, central processing units (CPUs) 111 and 122 control the driving of the camera 124 and the zoom lens 101.

By applying the zoom lens according to the present invention to a television camera as described above, an image pickup apparatus having a high optical performance may be realized.

The exemplary embodiments of the present invention are described above, but the present invention is not limited to these embodiments and can be modified and changed variously within the scope of the gist thereof.

Next, Numerical Embodiments 1 to 4 corresponding to Embodiments 1 to 4 of the present invention are shown below. In each of the numerical embodiments, represents the order of a surface from the object side, "ri" represents a radius of curvature of an i-th surface from the object side, "di" represents an interval on the object side between the i-th surface and the (i+1)th surface from the object side, and "ndi" and "vdi" respectively represent a refractive index and an Abbe number of the optical material between the i-th surface and the (i+1)th surface. The focal length, the F-number, and the angle of field represent values when focused on the object at infinity. BF is a distance from the final surface of the lens to the image plane.

Note that, the aspherical shape is expressed by the following expression:

$$x = (y^2/r)/\{1+(1-k \cdot y^2/r^2)^{0.5}\} + A4 \cdot y^4 + A6 \cdot y^6 + A8 \cdot y^8 + A10 \cdot y^{10} + A12 \cdot y^{12} + A14 \cdot y^{14} + A16 \cdot y^{16}$$

where X represents a coordinate in the optical axis direction, y represents a coordinate in a direction perpendicular to the optical axis, r represents a standard radius of curvature, k represents a conic constant, and An represents an n-th order aspherical coefficient, provided that "e-x" means "×10$^{-x}$".

Note that, the lens surfaces having the aspherical surfaces are marked with asterisks (*) on the right side of surface numbers in the tables.

Further, the loci of the second lens unit and the third lens unit in each embodiment are represented by the following expression.

Note that, m2 in the expression represents a value obtained by normalizing the moving amount of the second lens unit from the wide-angle end to a moving amount from the wide-angle end to the telephoto end, which is 0 at the wide-angle end and 1 at the telephoto end. m3 represents a moving amount of the third lens unit from the wide-angle end. Bn represents an n-th moving amount coefficient.

$$m3 = B1 \cdot m2 + B2 \cdot m2^2 + B3 \cdot m2^3 + B4 \cdot m2^4 + B5 \cdot m2^5 + B6 \cdot m2^6$$

In the present invention, the loci of the second and third lens units are defined, and the fourth lens unit is used to correct the image plane position. However, it is needless to say that the present invention is applicable even when the lens for correcting the image plane position is any one of the second, third, and fourth lens units.

Correspondences between the embodiments and the conditional expressions described above are shown in Table 1.

TABLE 1

| | | Embodiment | | | |
|---|---|---|---|---|---|
| | | 1 | 2 | 3 | 4 |
| Zooming ratio Z | | 6.00 | 5.00 | 13.00 | 6.78 |
| Wide-angle end focal length fw | | 21.00 | 20.00 | 4.65 | 18.50 |
| f2 | | −25.40 | −25.71 | −10.20 | −23.24 |
| f3 | | 80.00 | 100.00 | 48.00 | 86.79 |
| f4 | | −95.00 | −80.00 | −55.00 | −84.00 |
| L2t | | 1.50 | 2.00 | 0.34 | 2.14 |
| L2tm | | 4.65 | 9.42 | 1.03 | 11.01 |
| L2w | | 4.00 | 13.20 | 0.33 | 13.80 |
| L3w | | 51.63 | 41.89 | 39.34 | 38.44 |
| Conditional Expression (1) | L2tm/L2t | 3.10 | 4.71 | 3.01 | 5.14 |
| Conditional Expression (2) | L2w/L3w | 0.08 | 0.32 | 0.008 | 0.36 |
| Conditional Expression (3) | f2/f3 | −0.32 | −0.26 | −0.21 | −0.27 |
| Conditional Expression (4) | L2w/L2tm | 0.86 | 1.40 | 0.32 | 1.25 |
| Conditional Expression (5) | f4/fw | −4.52 | −4.00 | −11.83 | −4.54 |
| Conditional Expression (6) | f2/fw | −1.21 | −1.29 | −2.19 | −1.26 |

Numerical Embodiment 1

| Unit mm | | | | |
|---|---|---|---|---|
| Surface data | | | | |
| i | ri | di | ndi | vdi | Effective diameter |
|---|---|---|---|---|---|
| 1* | 170.250 | 2.70 | 1.77250 | 49.6 | 84.46 |
| 2 | 43.763 | 25.14 | | | 69.41 |

-continued

Unit mm

| | | | | | |
|---|---|---|---|---|---|
| 3 | −115.047 | 2.20 | 1.80100 | 35.0 | 68.55 |
| 4 | 230.743 | 0.94 | | | 69.68 |
| 5 | 129.092 | 8.18 | 1.95906 | 17.5 | 71.23 |
| 6 | −538.566 | 0.50 | | | 71.12 |
| 7* | 159.298 | 9.89 | 1.60311 | 60.6 | 70.04 |
| 8 | −141.049 | 10.27 | | | 69.52 |
| 9 | −71.186 | 4.00 | 1.84666 | 23.8 | 64.85 |
| 10 | −84.133 | 9.71 | | | 65.95 |
| 11 | 513.979 | 1.40 | 1.84666 | 23.8 | 62.13 |
| 12 | 64.655 | 10.82 | 1.49700 | 81.5 | 60.94 |
| 13 | −401.208 | 0.20 | | | 61.10 |
| 14 | 261.225 | 4.14 | 1.49700 | 81.5 | 61.24 |
| 15 | −666.893 | 0.20 | | | 61.16 |
| 16 | 168.426 | 8.46 | 1.77250 | 49.6 | 61.76 |
| 17 | −121.781 | (Variable) | | | 61.69 |
| 18 | 40.751 | 1.20 | 2.00100 | 29.1 | 34.59 |
| 19 | 27.661 | 8.31 | | | 31.83 |
| 20 | −57.166 | 1.20 | 1.88300 | 40.8 | 30.76 |
| 21 | 85.066 | (Variable) | | | 30.04 |
| 22 | 85.066 | 5.57 | 1.72047 | 34.7 | 30.13 |
| 23 | −46.450 | 1.00 | 1.49700 | 81.5 | 29.89 |
| 24 | 617.097 | (Variable) | | | 28.92 |
| 25 | −46.699 | 1.00 | 1.77250 | 49.6 | 28.35 |
| 26 | 61.450 | 3.60 | 1.92286 | 18.9 | 30.14 |
| 27 | −276.523 | (Variable) | | | 30.50 |
| 28 (Stop) | ∞ | 1.50 | | | 35.53 |
| 29 | 287.050 | 3.27 | 1.77250 | 49.6 | 36.44 |
| 30 | −141.930 | 0.15 | | | 36.72 |
| 31 | 56.654 | 4.14 | 1.77250 | 49.6 | 37.30 |
| 32 | 328.106 | 0.15 | | | 36.95 |
| 33 | 72.796 | 7.66 | 1.48749 | 70.2 | 36.33 |
| 34 | −46.430 | 1.00 | 1.88300 | 40.8 | 35.63 |
| 35 | −1118.900 | 11.08 | | | 35.14 |
| 36 | 81.963 | 4.95 | 1.60311 | 60.6 | 32.04 |
| 37 | −67.745 | 0.10 | | | 31.59 |
| 38 | 22.373 | 5.55 | 1.48749 | 70.2 | 26.19 |
| 39 | 417.864 | 1.00 | 1.80518 | 25.4 | 24.62 |
| 40 | 20.325 | 4.23 | | | 21.41 |
| 41 | 44.412 | 4.87 | 1.48749 | 70.2 | 21.37 |
| 42 | −28.306 | 1.00 | 2.00069 | 25.5 | 21.11 |
| 43 | 46.691 | 10.21 | | | 21.47 |
| 44 | 92.235 | 5.50 | 1.92286 | 18.9 | 28.65 |
| 45 | −39.615 | 1.00 | 2.00069 | 25.5 | 28.96 |
| 46 | −73.486 | 50.03 | | | 29.43 |
| Image plane | ∞ | | | | |

Aspherical surface data

First surface k = 1.20165e+001  A 4 = 1.16984e−007  A 6 = 1.11912e−012
A 8 = −1.51242e−013  A10 = 3.85104e−017  A12 = 1.41344e−020
A14 = −1.18054e−023  A16 = −8.19975e−029

Seventh surface k = −1.18533e+001  A 4 = −6.94943e−008  A 6 = −3.69208e−011
A 8 = 1.34360e−013  A10 = −1.06729e−016  A12 = 2.80086e−020
A14 = 2.67232e−023  A16 = −1.39898e−026

Various data
Zoom ratio 6.00

| | Wide angle | Intermediate | Telephoto |
|---|---|---|---|
| Focal length | 21.00 | 87.93 | 125.94 |
| F-number | 2.77 | 2.77 | 3.66 |
| Half angle of field | 35.54 | 9.68 | 6.79 |
| Image height | 15.00 | 15.00 | 15.00 |
| Total lens length | 314.76 | 314.76 | 314.76 |
| BF | 50.03 | 50.03 | 50.03 |
| d17 | 0.33 | 57.49 | 65.29 |
| d21 | 4.00 | 4.65 | 1.50 |
| d24 | 51.63 | 3.71 | 7.98 |
| d27 | 20.80 | 10.92 | 2.00 |
| d46 | 50.03 | 50.03 | 50.03 |
| Entrance pupil position | 57.21 | 126.01 | 149.18 |
| Exit pupil position | −73.53 | −73.53 | −73.53 |
| Front principal point position | 74.64 | 151.36 | 146.75 |
| Rear principal point position | 29.03 | −37.91 | −75.91 |

Zoom lens unit data

| Unit | First surface | Focal length | Lens structure length | Front principal point position | Rear principal point position |
|---|---|---|---|---|---|
| 1 | 1 | 68.73 | 98.74 | 70.01 | 47.45 |
| 2 | 18 | −25.40 | 10.71 | 6.74 | −2.43 |
| 3 | 22 | 80.00 | 6.57 | 1.01 | −2.91 |
| 4 | 25 | −95.00 | 4.60 | −0.92 | −3.37 |
| 5 | 28 | 49.72 | 67.35 | 10.84 | −59.68 |

Zoom locus data

B1 = 64.262  B2 = 109.871  B3 = −361.468
B4 = 437.331  B5 = −199.900  B6 = 12.364

Single lens data

| Lens | First surface | Focal length |
|---|---|---|
| 1 | 1 | −76.60 |
| 2 | 3 | −94.93 |
| 3 | 5 | 107.79 |
| 4 | 7 | 125.11 |
| 5 | 9 | −630.83 |
| 6 | 11 | −86.62 |
| 7 | 12 | 112.58 |
| 8 | 14 | 377.13 |
| 9 | 16 | 92.23 |
| 10 | 18 | −89.45 |
| 11 | 20 | −38.34 |
| 12 | 22 | 42.17 |
| 13 | 23 | −86.62 |
| 14 | 25 | −34.05 |
| 15 | 26 | 54.09 |
| 16 | 29 | 122.76 |
| 17 | 31 | 87.64 |
| 18 | 33 | 59.20 |
| 19 | 34 | −54.56 |
| 20 | 36 | 62.03 |
| 21 | 38 | 48.10 |
| 22 | 39 | −26.32 |
| 23 | 41 | 36.14 |
| 24 | 42 | −17.33 |
| 25 | 44 | 30.27 |
| 26 | 45 | −86.38 |

Numerical Embodiment 2

Unit mm

Surface data

| Surface number | r | d | nd | vd | Effective diameter |
|---|---|---|---|---|---|
| 1* | 152.946 | 2.70 | 1.77250 | 49.6 | 88.26 |
| 2 | 42.913 | 21.97 | | | 71.02 |
| 3 | −290.720 | 2.20 | 1.69680 | 55.5 | 70.62 |
| 4 | 198.244 | 5.10 | | | 69.69 |
| 5 | 92.190 | 8.05 | 1.92286 | 18.9 | 71.32 |

-continued

Unit mm

| | | | | | |
|---|---|---|---|---|---|
| 6 | 183.852 | 1.50 | | | 70.56 |
| 7* | 129.463 | 8.07 | 1.60311 | 60.6 | 70.69 |
| 8 | -469.585 | 13.91 | | | 70.38 |
| 9 | 193.883 | 1.40 | 1.84666 | 23.8 | 66.24 |
| 10 | 53.705 | 13.59 | 1.49700 | 81.5 | 63.89 |
| 11 | -915.793 | 0.20 | | | 63.96 |
| 12 | 153.823 | 6.07 | 1.49700 | 81.5 | 64.02 |
| 13 | -2497.182 | 0.20 | | | 63.71 |
| 14 | 179.148 | 9.55 | 1.77250 | 49.6 | 63.09 |
| 15 | -116.727 | (Variable) | | | 62.43 |
| 16 | 100.910 | 1.20 | 1.77250 | 49.6 | 35.03 |
| 17 | 32.733 | 5.88 | | | 31.50 |
| 18 | -70.950 | 1.20 | 1.72916 | 54.7 | 30.80 |
| 19 | 68.926 | (Variable) | | | 29.51 |
| 20 | 99.693 | 2.74 | 1.71736 | 29.5 | 26.82 |
| 21 | -260.213 | (Variable) | | | 26.44 |
| 22 | -32.225 | 1.00 | 1.77250 | 49.6 | 26.25 |
| 23 | 53.944 | 4.39 | 1.92286 | 18.9 | 28.77 |
| 24 | -115.090 | (Variable) | | | 29.29 |
| 25(Stop) | ∞ | 1.50 | | | 30.65 |
| 26 | 476.468 | 3.27 | 1.77250 | 49.6 | 31.42 |
| 27 | -84.289 | 0.15 | | | 31.74 |
| 28 | 87.373 | 3.10 | 1.77250 | 49.6 | 32.00 |
| 29 | -1009.541 | 0.15 | | | 31.83 |
| 30 | 46.739 | 6.54 | 1.48749 | 70.2 | 31.15 |
| 31 | -57.076 | 1.00 | 1.84666 | 23.8 | 30.46 |
| 32 | 55.202 | 10.85 | | | 29.50 |
| 33 | 45.838 | 5.25 | 1.72916 | 54.7 | 30.92 |
| 34 | -110.502 | 0.10 | | | 30.57 |
| 35 | 56.345 | 4.64 | 1.48749 | 70.2 | 28.64 |
| 36 | -75.036 | 1.00 | 1.80518 | 25.4 | 27.74 |
| 37 | 35.746 | 8.23 | | | 26.20 |
| 38 | 41.815 | 7.00 | 1.80809 | 22.8 | 28.72 |
| 39 | -35.739 | 1.00 | 1.64000 | 60.1 | 28.47 |
| 40 | 28.730 | 3.88 | | | 26.44 |
| 41 | 36.580 | 7.98 | 1.49700 | 81.5 | 27.08 |
| 42 | -25.203 | 1.00 | 2.00069 | 25.5 | 26.87 |
| 43 | -78.734 | 50.07 | | | 27.66 |
| Image plane | ∞ | | | | |

Aspherical surface data

First surface k = 9.49770e+000   A 4 = 1.41404e-007   A 6 = -8.11081e-011
A 8 = -8.91733e-014   A10 = 9.07733e-018   A12 = 1.22996e-020
A14 = -3.34625e-024   A16 = -2.85941e-027

Seventh surface k = -1.01535e+001   A 4 = 2.41448e-008   A 6 = -8.83432e-011
A 8 = 9.15680e-014   A10 = 1.31238e-017   A12 = -6.30445e-020
A14 = 4.91891e-023   A16 = -1.29340e-026

Various data
Zoom ratio 5.00

| | Wide angle | Intermediate | Telephoto |
|---|---|---|---|
| Focal length | 20.00 | 69.46 | 100.00 |
| F-number | 2.76 | 2.77 | 2.77 |
| Half angle of field | 36.50 | 12.03 | 8.42 |
| Image height | 14.80 | 14.80 | 14.80 |
| Total lens length | 294.44 | 294.44 | 294.44 |
| BF | 50.07 | 50.07 | 50.07 |
| d15 | 0.33 | 47.29 | 54.93 |
| d19 | 13.20 | 9.42 | 2.00 |
| d21 | 41.89 | 3.85 | 7.88 |
| d24 | 11.40 | 6.26 | 2.00 |
| d43 | 50.07 | 50.07 | 50.07 |
| Entrance pupil position | 55.04 | 111.18 | 132.17 |
| Exit pupil position | -54.21 | -54.21 | -54.21 |

-continued

Unit mm

| | | | |
|---|---|---|---|
| Front principal point position | 71.20 | 134.37 | 136.28 |
| Rear principal point position | 30.07 | -19.39 | -49.93 |

Zoom lens unit data

| Unit | First surface | Focal length | Lens structure length | Front principal point position | Rear principal point position |
|---|---|---|---|---|---|
| 1 | 1 | 62.90 | 94.51 | 65.09 | 38.14 |
| 2 | 16 | -25.71 | 8.28 | 4.20 | -2.75 |
| 3 | 20 | 100.00 | 2.74 | 0.44 | -1.15 |
| 4 | 22 | -80.00 | 5.39 | -1.97 | -4.92 |
| 5 | 25 | 42.13 | 66.64 | 8.93 | -42.89 |

Zoom locus data

B1 = 43.851   B2 = 126.862   B3 = -384.782
B4 = 443.393   B5 = -166.042   B6 = -19.878

Single lens data

| Lens | First surface | Focal length |
|---|---|---|
| 1 | 1 | -77.68 |
| 2 | 3 | -168.12 |
| 3 | 5 | 189.86 |
| 4 | 7 | 168.46 |
| 5 | 9 | -87.28 |
| 6 | 10 | 102.25 |
| 7 | 12 | 290.92 |
| 8 | 14 | 92.36 |
| 9 | 16 | -62.90 |
| 10 | 18 | -47.57 |
| 11 | 20 | 100.00 |
| 12 | 22 | -25.86 |
| 13 | 23 | 39.81 |
| 14 | 26 | 92.50 |
| 15 | 28 | 103.73 |
| 16 | 30 | 53.64 |
| 17 | 31 | -32.68 |
| 18 | 33 | 44.88 |
| 19 | 35 | 66.56 |
| 20 | 36 | -29.67 |
| 21 | 38 | 24.60 |
| 22 | 39 | -24.64 |
| 23 | 41 | 31.28 |
| 24 | 42 | -37.05 |

Numerical Embodiment 3

Unit mm

Surface date

| i | ri | di | ndi | vdi | Effective diameter |
|---|---|---|---|---|---|
| 1 | 91.506 | 2.50 | 1.77250 | 49.6 | 81.17 |
| 2 | 33.027 | 18.20 | | | 60.05 |
| 3 | 211.834 | 1.80 | 1.81600 | 46.6 | 59.41 |
| 4 | 54.197 | 13.70 | | | 55.90 |
| 5 | -82.253 | 1.70 | 1.81600 | 46.6 | 56.00 |
| 6 | 628.489 | 0.20 | | | 58.73 |
| 7 | 110.105 | 6.61 | 1.80518 | 25.4 | 61.93 |
| 8 | -1149.207 | 5.20 | | | 62.16 |
| 9 | -134.501 | 8.20 | 1.60311 | 60.6 | 62.53 |
| 10* | -51.776 | 5.18 | | | 63.00 |
| 11 | -461.386 | 9.91 | 1.43875 | 94.9 | 59.93 |
| 12 | -55.551 | 1.65 | 1.80518 | 25.4 | 60.15 |

-continued

Unit mm

| | | | | | |
|---|---|---|---|---|---|
| 13 | −85.336 | 3.06 | | | 61.73 |
| 14 | 75.564 | 1.65 | 1.83400 | 37.2 | 61.55 |
| 15 | 49.424 | 18.80 | 1.43875 | 94.9 | 59.51 |
| 16 | −80.251 | 0.20 | | | 59.12 |
| 17 | 255.375 | 5.83 | 1.43387 | 95.1 | 56.33 |
| 18 | −182.790 | 0.20 | | | 55.88 |
| 19 | 52.837 | 5.34 | 1.60311 | 60.6 | 51.80 |
| 20 | 108.886 | (Variable) | | | 50.73 |
| 21 | 28.575 | 0.80 | 1.88300 | 40.8 | 23.47 |
| 22 | 17.674 | 4.37 | | | 21.14 |
| 23 | 54.391 | 1.00 | 1.88300 | 40.8 | 19.18 |
| 24 | 15.688 | 6.40 | | | 17.17 |
| 25 | −26.632 | 3.77 | 1.80518 | 25.4 | 16.40 |
| 26 | −13.763 | 0.85 | 1.88300 | 40.8 | 16.69 |
| 27 | −88.755 | (Variable) | | | 17.28 |
| 28 | 57.490 | 2.18 | 1.72825 | 28.5 | 17.95 |
| 29 | −89.632 | (Variable) | | | 18.17 |
| 30 | −30.508 | 0.80 | 1.73400 | 51.5 | 18.25 |
| 31 | 48.899 | 2.05 | 1.80809 | 22.8 | 19.51 |
| 32 | −194.327 | (Variable) | | | 19.80 |
| 33(Stop) | ∞ | 1.46 | | | 26.16 |
| 34 | −285.206 | 2.86 | 1.67003 | 47.2 | 26.82 |
| 35 | −41.319 | 0.10 | | | 27.16 |
| 36 | 105.009 | 2.49 | 1.64000 | 60.1 | 27.72 |
| 37 | −120.482 | 0.20 | | | 27.71 |
| 38 | 43.749 | 6.43 | 1.51633 | 64.1 | 27.23 |
| 39 | −43.154 | 1.00 | 1.88300 | 40.8 | 26.53 |
| 40 | 169.018 | 30.05 | | | 26.09 |
| 41 | −64.120 | 4.12 | 1.56732 | 42.8 | 24.71 |
| 42 | −34.235 | 1.95 | | | 25.35 |
| 43 | −30605.234 | 1.00 | 1.88300 | 40.8 | 24.88 |
| 44 | 18.874 | 8.87 | 1.51633 | 64.1 | 24.57 |
| 45 | −43.522 | 0.30 | | | 25.50 |
| 46 | 62.813 | 7.65 | 1.48749 | 70.2 | 26.48 |
| 47 | −25.472 | 1.00 | 1.88300 | 40.8 | 26.56 |
| 48 | −1771.059 | 0.19 | | | 27.86 |
| 49 | 56.592 | 8.80 | 1.48749 | 70.2 | 28.98 |
| 50 | −26.889 | 3.34 | | | 29.37 |
| 51 | ∞ | 33.00 | 1.60859 | 46.4 | 25.96 |
| 52 | ∞ | 13.20 | 1.51680 | 64.2 | 17.04 |
| 53 | ∞ | 5.00 | | | 13.25 |
| Image plane | ∞ | | | | |

Aspherical surface data

Tenth surface k = 9.16806e−001   A 4 = 1.06653e−006   A 6 = 4.77333e−010
A 8 = 7.02528e−013   A10 = −6.33716e−016   A12 = 5.87519e−019
A14 = 0.0   A16 = 0.0

Various data
Zoom ratio 13.00

| | Wide angle | Intermediate | Telephoto |
|---|---|---|---|
| Focal length | 4.65 | 29.63 | 60.43 |
| F-number | 1.90 | 1.90 | 2.80 |
| Half angle of field | 49.79 | 10.52 | 5.20 |
| Image height | 5.50 | 5.50 | 5.50 |
| Total lens length | 317.33 | 317.33 | 317.33 |
| BF | 5.00 | 5.00 | 5.00 |
| d20 | 0.97 | 37.97 | 43.50 |
| d27 | 0.33 | 1.03 | 0.34 |
| d29 | 39.34 | 1.13 | 7.39 |
| d32 | 11.55 | 12.05 | 0.95 |
| d53 | 5.00 | 5.00 | 5.00 |
| Entrance pupil position | 37.81 | 77.74 | 111.15 |
| Exit pupil position | 167.76 | 167.76 | 167.76 |
| Front principal point position | 42.59 | 112.76 | 194.03 |
| Rear principal point position | 0.35 | −24.63 | −55.44 |

Zoom lens unit data

| Unit | First surface | Focal length | Lens structure length | Front principal point position | Rear principal point position |
|---|---|---|---|---|---|
| 1 | 1 | 27.78 | 109.93 | 49.44 | 37.12 |
| 2 | 21 | −10.20 | 17.18 | 5.81 | −7.49 |
| 3 | 28 | 48.00 | 2.18 | 0.49 | −0.77 |
| 4 | 30 | −55.00 | 2.85 | −0.41 | −2.01 |
| 5 | 33 | 71.03 | 128.01 | 92.19 | −141.76 |

Zoom locus data

| B1 = 47.496 | B2 = −8.289 | B3 = −1.264 |
|---|---|---|
| B4 = 7.645 | B5 = 6.645 | B6 = 9.689 |

Single lens data

| Lens | First surface | Focal length |
|---|---|---|
| 1 | 1 | −67.85 |
| 2 | 3 | −89.26 |
| 3 | 5 | −88.59 |
| 4 | 7 | 123.94 |
| 5 | 9 | 134.02 |
| 6 | 11 | 142.52 |
| 7 | 12 | −200.84 |
| 8 | 14 | −175.27 |
| 9 | 15 | 72.76 |
| 10 | 17 | 245.92 |
| 11 | 19 | 163.64 |
| 12 | 21 | −54.03 |
| 13 | 23 | −25.13 |
| 14 | 25 | 30.98 |
| 15 | 26 | −18.44 |
| 16 | 28 | 48.00 |
| 17 | 30 | −25.37 |
| 18 | 31 | 48.03 |
| 19 | 34 | 71.42 |
| 20 | 36 | 87.70 |
| 21 | 38 | 43.00 |
| 22 | 39 | −38.62 |
| 23 | 41 | 122.61 |
| 24 | 43 | −21.24 |
| 25 | 44 | 26.70 |
| 26 | 46 | 38.14 |
| 27 | 47 | −29.11 |
| 28 | 49 | 38.60 |
| 29 | 51 | 0.00 |
| 30 | 52 | 0.00 |

Numerical Embodiment 4

Unit mm

Surface data

| i | ri | di | ndi | vdi | Effective diameter |
|---|---|---|---|---|---|
| 1* | 226.101 | 2.70 | 1.77250 | 49.6 | 92.26 |
| 2 | 44.306 | 26.14 | | | 73.29 |
| 3 | −130.790 | 2.20 | 1.77250 | 49.6 | 72.90 |
| 4 | 207.823 | 0.20 | | | 74.15 |
| 5 | 116.035 | 6.99 | 1.95906 | 17.5 | 75.82 |
| 6 | 714.649 | 0.50 | | | 75.66 |

Unit mm

| | | | | | |
|---|---|---|---|---|---|
| 7* | 202.656 | 12.60 | 1.60311 | 60.6 | 75.46 |
| 8 | −91.158 | 11.93 | | | 75.19 |
| 9 | −68.521 | 2.00 | 1.84666 | 23.8 | 66.65 |
| 10 | −86.983 | 7.68 | | | 67.78 |
| 11 | 321.180 | 1.40 | 1.84666 | 23.8 | 66.10 |
| 12 | 65.869 | 12.81 | 1.49700 | 81.5 | 65.06 |
| 13 | −384.669 | 0.20 | | | 65.40 |
| 14 | 280.395 | 7.10 | 1.59522 | 67.7 | 65.78 |
| 15 | −215.303 | 0.20 | | | 65.74 |
| 16 | 153.621 | 8.83 | 1.77250 | 49.6 | 65.10 |
| 17 | −140.533 | (Variable) | | | 64.89 |
| 18 | 46.349 | 1.20 | 2.00100 | 29.1 | 32.89 |
| 19 | 27.608 | 6.54 | | | 29.92 |
| 20 | −87.445 | 1.20 | 1.88300 | 40.8 | 28.99 |
| 21 | 54.870 | (Variable) | | | 27.69 |
| 22 | 80.707 | 4.13 | 1.72047 | 34.7 | 26.09 |
| 23 | −62.385 | 1.00 | 1.49700 | 81.5 | 25.76 |
| 24 | 471.774 | (Variable) | | | 25.92 |
| 25 | −37.865 | 1.00 | 1.77250 | 49.6 | 26.09 |
| 26 | 52.253 | 4.00 | 1.92286 | 18.9 | 28.11 |
| 27 | −176.862 | (Variable) | | | 28.56 |
| 28(Stop) | ∞ | 1.50 | | | 35.16 |
| 29 | 755.277 | 3.02 | 1.77250 | 49.6 | 35.91 |
| 30 | −126.031 | 0.15 | | | 36.23 |
| 31 | 94.216 | 3.15 | 1.77250 | 49.6 | 36.77 |
| 32 | 1040.417 | 0.15 | | | 36.65 |
| 33 | 37.128 | 9.53 | 1.48749 | 70.2 | 36.10 |
| 34 | −52.728 | 1.00 | 1.88300 | 40.8 | 35.32 |
| 35 | 2712.724 | 9.72 | | | 34.61 |
| 36 | 81.344 | 4.60 | 1.60311 | 60.6 | 31.07 |
| 37 | −73.512 | 0.10 | | | 30.55 |
| 38 | 28.412 | 5.05 | 1.48749 | 70.2 | 26.10 |
| 39 | −200.725 | 1.00 | 1.80518 | 25.4 | 24.67 |
| 40 | 21.818 | 4.76 | | | 21.60 |
| 41 | 30.189 | 5.65 | 1.48749 | 70.2 | 21.53 |
| 42 | −27.517 | 1.00 | 2.00069 | 95.5 | 21.29 |
| 43 | 49.039 | 10.94 | | | 21.74 |
| 44 | 100.883 | 5.44 | 1.92286 | 18.9 | 29.73 |
| 45 | −41.914 | 1.00 | 2.00069 | 25.5 | 30.05 |
| 46 | −69.795 | 50.08 | | | 30.53 |
| Image plane | ∞ | | | | |

Aspherical surface data

First surface k = 1.89043e+001  A 4 = 9.74647e−008  A 6 = 1.90772e−010
A 8 = −2.98807e−013  A10 = 1.09246e−016  A12 = 1.27731e−020
A14 = −2.09283e−023  A16 = 3.63735e−027

Seventh surface k = −2.40898e+001  A 4 = −2.11485e−007  A 6 = −6.31059e−011
A 8 = 1.22005e−013  A10 = −4.67965e−017  A12 = −2.52977e−021
A14 = 1.24714e−023  A16 = −2.17199e−027

Various data
Zoom ratio 6.78

| | Wide angle | Intermediate | Telephoto |
|---|---|---|---|
| Focal length | 18.50 | 64.72 | 125.38 |
| F-number | 2.77 | 2.77 | 3.66 |
| Half angle of field | 39.04 | 13.05 | 6.82 |
| Image height | 15.00 | 15.00 | 15.00 |
| Total lens length | 315.01 | 315.01 | 315.01 |
| BF | 50.08 | 50.08 | 50.08 |
| d17 | 0.33 | 44.38 | 55.40 |
| d21 | 13.80 | 11.01 | 2.14 |
| d24 | 38.44 | 3.83 | 15.07 |
| d27 | 22.04 | 15.39 | 2.00 |
| d46 | 50.08 | 50.08 | 50.08 |
| Entrance pupil position | 53.25 | 106.15 | 152.12 |
| Exit pupil position | −83.19 | −83.19 | −83.19 |
| Front principal point position | 69.18 | 139.44 | 159.54 |
| Rear principal point position | 31.58 | −14.63 | −75.30 |

Zoom lens unit data

| Unit | First surface | Focal length | Lens structure length | Front principal point position | Rear principal point position |
|---|---|---|---|---|---|
| 1 | 1 | 54.36 | 103.47 | 64.70 | 40.95 |
| 2 | 18 | −23.24 | 8.94 | 5.23 | −2.25 |
| 3 | 22 | 86.79 | 5.13 | 0.48 | −2.59 |
| 4 | 25 | −84.00 | 5.00 | −1.31 | −4.00 |
| 5 | 28 | 51.29 | 67.77 | 14.66 | −62.67 |

Zoom locus data

B1 = 43.851  B2 = 126.862  B3 = −384.782
B4 = 443.393  B5 = −166.042  B6 = −19.878

Single lens data

| Lens | First surface | Focal length |
|---|---|---|
| 1 | 1 | −71.45 |
| 2 | 3 | −103.12 |
| 3 | 5 | 141.72 |
| 4 | 7 | 105.55 |
| 5 | 9 | −397.41 |
| 6 | 11 | −97.16 |
| 7 | 12 | 113.90 |
| 8 | 14 | 204.99 |
| 9 | 16 | 95.81 |
| 10 | 18 | −69.91 |
| 11 | 20 | −37.81 |
| 12 | 22 | 49.10 |
| 13 | 23 | −110.47 |
| 14 | 25 | −28.15 |
| 15 | 26 | 43.54 |
| 16 | 29 | 139.36 |
| 17 | 31 | 133.27 |
| 18 | 33 | 46.15 |
| 19 | 34 | −58.23 |
| 20 | 36 | 64.50 |
| 21 | 38 | 51.25 |
| 22 | 39 | −24.17 |
| 23 | 41 | 30.41 |
| 24 | 42 | −17.34 |
| 25 | 44 | 32.29 |
| 26 | 45 | −105.79 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-144608, filed Jul. 10, 2013 which is hereby incorporated by reference herein in its entirety.

What is claimed is:

1. A zoom lens comprising, in order from an object side to an image side:
   a first lens unit having a positive refractive power which does not move for zooming;
   a second lens unit having a negative refractive power which moves during zooming;

a third lens unit having a positive refractive power which moves during zooming;
a fourth lens unit having a negative refractive power which moves during zooming; and
a fifth lens unit having a positive refractive power which does not move for zooming, wherein:

the first lens unit comprises, in order from the object side to the image side, a first sub lens unit having a negative refractive power which does not move for focusing, a second sub lens unit having a positive refractive power which moves during focusing, and a third sub lens unit having a positive refractive power which does not move for focusing;

the third sub lens unit comprises a negative lens; and the following conditions are satisfied:

$1.6 < L2tm/L2t < 1000.0;$ $L2w/L3w < 1.0;$ and $-0.5 < f2/f3 < -0.05,$ where L2t represents an interval between the second lens unit and the third lens unit at a telephoto end, L2tm represents an interval between the second lens unit and the third lens unit at a zoom position at which an interval between the third lens unit and the fourth lens unit is minimum, L2w represents an interval between the second lens unit and the third lens unit at a wide-angle end, L3w represents an interval between the third lens unit and the fourth lens unit at the wide-angle end, f2 represents a focal length of the second lens unit, and f3 represents a focal length of the third lens unit.

2. The zoom lens according to claim 1, wherein the following condition is satisfied:

$L2w/L2tm < 1.6.$

3. The zoom lens according to claim 1, wherein the following conditions are satisfied:

$-20.0 < f4/fw < -2.0;$ and $-3.0 < f2/fw < -0.7,$ where f4 represents a focal length of the fourth lens unit and fw represents a focal length of the zoom lens at the wide-angle end.

4. The zoom lens according to claim 1, wherein the third lens unit comprises at least one negative lens and one positive lens.

5. An image pickup apparatus comprising:
a zoom lens comprising, in order from an object side to an image side:
a first lens unit having a positive refractive power which does not move for zooming;
a second lens unit having a negative refractive power which moves during zooming;
a third lens unit having a positive refractive power which moves during zooming;
a fourth lens unit having a negative refractive power which moves during zooming; and
a fifth lens unit having a positive refractive power which does not move for zooming, wherein:

the first lens unit comprises, in order from the object side to the image side, a first sub lens unit having a negative refractive power which does not move for focusing, a second sub lens unit having a positive refractive power which moves during focusing, and a third sub lens unit having a positive refractive power which does not move for focusing;

the third sub lens unit comprises a negative lens; and the following conditions are satisfied:

$1.6 < L2tm/L2t < 1000.0;$ $L2w/L3w < 1.0;$ and $-0.5 < f2/f3 < -0.05,$ where L2t represents an interval between the second lens unit and the third lens unit at a telephoto end, L2tm represents an interval between the second lens unit and the third lens unit at a zoom position at which an interval between the third lens unit and the fourth lens unit is minimum, L2w represents an interval between the second lens unit and the third lens unit at a wide-angle end, L3w represents an interval between the third lens unit and the fourth lens unit at the wide-angle end, f2 represents a focal length of the second lens unit, and f3 represents a focal length of the third lens unit; and a solid state image pickup element for receiving an image formed by the zoom lens.

\* \* \* \* \*